US008615623B2

(12) United States Patent
Hidaka et al.

(10) Patent No.: US 8,615,623 B2
(45) Date of Patent: Dec. 24, 2013

(54) INTERNET CONNECTION SWITCH AND INTERNET CONNECTION SYSTEM

(75) Inventors: Youichi Hidaka, Tokyo (JP); Jun Suzuki, Tokyo (JP); Junichi Higuchi, Tokyo (JP); Takashi Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 525 days.

(21) Appl. No.: 12/376,609

(22) PCT Filed: Aug. 8, 2007

(86) PCT No.: PCT/JP2007/065488
§ 371 (c)(1),
(2), (4) Date: Feb. 6, 2009

(87) PCT Pub. No.: WO2008/018485
PCT Pub. Date: Feb. 14, 2008

(65) Prior Publication Data
US 2010/0180062 A1    Jul. 15, 2010

(30) Foreign Application Priority Data
Aug. 9, 2006    (JP) .................................. 2006-216495

(51) Int. Cl.
G06F 13/00    (2006.01)
(52) U.S. Cl.
USPC .......................................... 710/316; 710/312
(58) Field of Classification Search
USPC ................. 710/305, 306, 311–313, 316, 317
See application file for complete search history.

(56) References Cited

U.S. PATENT DOCUMENTS

| 7,430,630 | B2* | 9/2008 | Boyd et al. ................. 710/316 |
| 7,694,047 | B1* | 4/2010 | Alston ............................. 710/62 |
| 2003/0217219 | A1* | 11/2003 | Sharma et al. .............. 710/311 |
| 2005/0251599 | A1* | 11/2005 | Hum et al. ................... 710/100 |
| 2006/0242354 | A1* | 10/2006 | Johnsen et al. ............. 710/316 |
| 2009/0164694 | A1* | 6/2009 | Talayco et al. ............ 710/316 |

FOREIGN PATENT DOCUMENTS

| JP | 1993292091 A | 11/1993 |
| JP | 1997064886 A | 3/1997 |
| JP | 2003337805 A | 11/2003 |
| JP | 2005512194 A | 4/2005 |
| JP | 2005286681 A | 10/2005 |
| JP | 2005317021 A | 11/2005 |
| JP | 2005318074 A | 11/2005 |

(Continued)

OTHER PUBLICATIONS

PCI Express Overview, PLX Technology Brief v. 1.1, <http://www.plxtech.com/files/pdf/technical/expresslane/TechnologyBrief_PCIExpress_Q4-2003.pdf>, accessed on Jul. 28, 2010.*

(Continued)

Primary Examiner — Khanh Dang

(57) ABSTRACT

A switch (304) includes a plurality of bridges (3041, 3042, 3043, 3044, 3045) and a switch forwarding mechanism (20). Each of the bridges transmits and receives a TLP frame complying with PCI express to and from a device connected to each of the bridges. The switch forwarding mechanism includes a plurality of ports (1, 2, 3, 4, 5) to which the bridges are connected, respectively, selects an output port in dependence on a combination of destination information on the TLP frame input from one of the plurality of ports and the port which input the TLP frame, and outputs the TLP frame from the selected output port.

13 Claims, 25 Drawing Sheets

(56) References Cited

FOREIGN PATENT DOCUMENTS

| JP | 2005332386 A | 12/2005 |
|---|---|---|
| JP | 2005332396 A | 12/2005 |
| JP | 2006195821 A | 7/2006 |
| JP | 2007086963 A | 4/2007 |
| JP | 2007272871 A | 10/2007 |

OTHER PUBLICATIONS

International Search Report for PCT/JP2007/065488 mailed Nov. 13, 2007.
PCI Express Base Specification Revision 1.1, PCI-SIG, Mar. 28, 2005, pp. 30.
PCI Express Base Specification Revision 1.1, PCI-SIG, Mar. 28, 2005, pp. 34.
PCI Express Base Specification Revision 1.1, PCI-SIG., Mar. 28, 2005, pp. 52-53.
PCI Express Base Specification Revision 1.1, PCI-SIG., Mar. 28, 2005, pp. 54-55.
Protocol Interface #8 (PI-8) R1.0, ASI-SIG, Feb. 2004, pp. 7-11.
Tametoshi Yokogawa, "PCI Express no Device & Board Sekkei—Butsuriso, Mac-so no Jisso kara Application made—", Design Wave Magazine, vol. 11, No. 1, pp. 59 to 61. Jan. 2006.
"NEC Electronics wa, Ima Okyakusama to Tomoni, Kakushin no Mirai e.", [online], Sep. 27, 2004, NEC Electronics Corp., [retrieval date Oct. 31, 2007], Internet<URL:http://www.necel.com/ad/ja/solution/pdf/solution2.pdf.
PEX 8518 Flexible & Versatile PCI Express Switch, Version 1.1, [online], 2005, PLX Technology, [retrieval date Oct. 31, 2007)], Internet<URL: http://www.paltek.co.jp/plx/products/01_PCI-Express/01_pdf/PEX8518_ProductBrief.pdf.
Japanese Office Action for JP2008-528845 issued Jan. 27, 2012.
T. Yokokawa, "Extended Standard ASI extending PCI Express to built-in field", Design Wave Magazine, CQ Publishing Co., Ltd., Jan. 2006, pp. 59-68.

* cited by examiner

FIG.4

GROUP ID MANAGEMENT TABLE MEMORY 2047

| PORT NUMBER | GROUP ID(4BIT) | PORT ATTRIBUTE | DEVICE ATTRIBUTE |
|---|---|---|---|
| 0x0 | RESERVED | RESERVED | RESERVED |
| 1 | 1 | 0:DEVICE | 0:ROOT |
| 2 | 2 | 0:DEVICE | 0:ROOT |
| 3 | 1 | 0:DEVICE | 1:ENDPOINT |
| 4 | 2 | 0:DEVICE | 1:ENDPOINT |
| 5 | 2 | 0:DEVICE | 1:ENDPOINT |
| : | : | : | : |
| 0xF | 0 | 1:SWITCH | 2:BRIDGE |

FIG.8

EXTENSION ADDRESS ROUTING TABLE MEMORY 2044

| LOWER LIMIT OF TLP DESTINATION ADDRESS SPACE | UPPER LIMIT OF TLP DESTINATION ADDRESS SPACE | GROUP ID | OUTPUT PORT INFORMATION | ADDRESS SWAP OFFSET INFORMATION |
|---|---|---|---|---|
| 0x00-08-00-00 | 0x00-08-10-00 | 1 | 1 | 0x00-00-00-00 |
| 0x00-08-30-00 | 0x00-09-00-00 | 2 | 2 | 0x00-40-00-00 |
| 0x00-10-00-00 | 0x00-20-00-00 | 2 | 4 | 0x01-00-00-00 |
| .. | .. | .. | .. | .. |
| 0x00-30-00-00 | 0x00-40-00-00 | 1 | 3 | 0x00-00-00-00 |

FIG.9

EXTENSION ID ROUTING TABLE MEMORY 2045

| BUS NUMBER [6:0] | DEVICE NUMBER [7:3] | FUNCTION NUMBER [2:0] | GROUP ID | OUTPUT PORT INFORMATION |
|---|---|---|---|---|
| 01 | 01 | 1 | 1 | 1 |
| 02 | 02 | 2 | 2 | 1 |
| 03 | 03 | 3 | 1 | 3 |
| : | : | : | : | : |
| 7F | 1F | 7 | 2 | 2 |

FIG.10

MULTICAST TABLE MEMORY 2046

| MEMORY ADDRESS | PLURAL OUTPUT PORT INFORMATION |
|---|---|
| 0x0000 | 0000 0000 0000 1101 |
| 0x0001 | 0000 0000 0000 1000 |
| : | : |
| : | : |
| (0d32767)0x7FFF | 0000 0000 0001 1100 |

FIG.13

EXTENSION ADDRESS ROUTING TABLE MEMORY (CPU-CPU COMMUNICATION)

| LOWER LIMIT OF TLP DESTINATION ADDRESS SPACE | UPPER LIMIT OF TLP DESTINATION ADDRESS SPACE | GROUP ID | OUTPUT PORT INFORMATION | ADDRESS SWAP OFFSET INFORMATION | |
|---|---|---|---|---|---|
| 0x00-08-00-00 | 0x00-08-10-00 | 1 | 1 | 0x00-00-00-00 | |
| 0x00-08-30-00 | 0x00-09-00-00 | 2 | 2 | 0x00-00-00-00 | |
| 0x00-10-00-00 | 0x00-20-00-00 | 1 | 3 | 0x00-00-00-00 | |
| 0x00-20-00-00 | 0x00-30-00-00 | 2 | 4 | 0x00-00-00-00 | |
| 0x00-30-00-00 | 0x00-40-00-00 | 2 | 5 | 0x00-00-00-00 | |
| ... | ... | ... | ... | ... | |
| 0x00-00-10-00 | 0x00-00-20-00 | 1 | 2 | 0x00-00-10-00 | ～E1 |
| 0x00-00-10-00 | 0x00-00-20-00 | 2 | 1 | 0x00-00-10-00 | ～E2 |
| ANOTHER | ANOTHER | 1 | 1 | | |
| ANOTHER | ANOTHER | 2 | 2 | | |

FIG.14

GROUP ID MANAGEMENT TABLE MEMORY

| PORT NUMBER | GROUP ID(4BIT) | PORT ATTRIBUTE | DEVICE ATTRIBUTE |
|---|---|---|---|
| 0x0 | RESERVED | RESERVED | RESERVED |
| 1 | 1 | 0:DEVICE | 0:ROOT |
| 2 | 2 | 0:DEVICE | 0:ROOT |
| 3 | 3 | 0:DEVICE | 1:ENDPOINT |
| 4 | 2 | 0:DEVICE | 1:ENDPOINT |
| 5 | 2 | 0:DEVICE | 1:ENDPOINT |
| : | : | : | : |
| 0xF | 0 | 1:SWITCH | 2:BRIDGE |

FIG.16

EXTENSION ADDRESS ROUTING TABLE MEMORY (CPU101 CPU108 USE ENDPOINT 105)

| LOWER LIMIT OF TLP DESTINATION ADDRESS SPACE | UPPER LIMIT OF TLP DESTINATION ADDRESS SPACE | GROUP ID | OUTPUT PORT INFORMATION | ADDRESS SWAP OFFSET INFORMATION | |
|---|---|---|---|---|---|
| 0x00-08-00-00 | 0x00-08-10-00 | 1 | 1 | 0x00-00-00-00 | |
| 0x00-08-30-00 | 0x00-09-00-00 | 2 | 2 | 0x00-00-00-00 | |
| 0x00-10-00-00 | 0x00-20-00-00 | 1 | 3 | 0x00-00-00-00 | ← E11 |
| 0x00-40-00-00 | 0x00-50-00-00 | 2 | 3 | 0x00-00-00-00 | ← E12 |
| 0x00-08-00-00 | 0x00-08-10-00 | 3 | 1 | 0x00-00-00-00 | ← E13 |
| 0x00-08-30-00 | 0x00-09-00-00 | 3 | 2 | 0x00-00-00-00 | ← E14 |
| 0x00-20-00-00 | 0x00-30-00-00 | 2 | 4 | 0x00-00-00-00 | |
| 0x00-30-00-00 | 0x00-40-00-00 | 2 | 5 | 0x00-00-00-00 | |
| ... | ... | ... | ... | ... | |
| 0x00-00-10-00 | 0x00-00-20-00 | 1 | 2 | 0x00-00-10-00 | |
| 0x00-00-10-00 | 0x00-00-20-00 | 2 | 1 | 0x00-00-10-00 | |
| ANOTHER | ANOTHER | 1 | 1 | | |
| ANOTHER | ANOTHER | 2 | 2 | | |
| ANOTHER | ANOTHER | 3 | 3 | | |

INTERNET CONNECTION SWITCH AND INTERNET CONNECTION SYSTEM

This application is the National Phase of PCT/JP2007/065488, filed Aug. 8, 2007, which is based upon and claims the benefit of priority from Japanese patent application No. 2006-216495, filed on Aug. 9, 2006, the disclosure of which is incorporated herein in its entirety by reference.

TECHNICAL FIELD

The present invention relates to a switch for interconnection for extending a PCI express interface of a computing device and a networking device used in a computer and a network apparatus and a system using the switch.

BACKGROUND ART

A peripheral component interconnect (PCI) has achieved its popularity as a bus standard for establishing connection among computing devices such as a central processing unit (CPU), a hard disk and a graphic controller, among networking devices such as a forwarding engine and a network controller or among computing devices and networking devices. As a next generation standard to this PCI, a PCI express using a serial bus in place of a parallel bus and holding a packet communication has been standardized. Non-Patent Document 1 describes an example of a PCI express system formed by this PCI express.

FIG. 19 typically shows the system described in the Non-Patent Document 1. The PCI express systems shown in FIG. 19 is configured to include a CPU 101 performing a central arithmetic processing of a computer, a PCI express route complex 102 mounted in a host bridge controlling an I/O access from the CPU 101, a memory 103 connected to the host bridge, a PCI express switch 104 connected to the route complex 102 and PCI express endpoints 105, 106 and 107 mounted in computing devices connected to the PCI express switch 104.

The PCI express switch 104 is employed to increase the number of connections of a PCI express interface connecting the endpoints. Non-Patent Document 2 describes an example of an internal circuit configuration of the PCI express switch 104.

FIG. 20 typically shows a switch described in the Non-Patent Document 2. The PCI express switch 104 shown in FIG. 20 is configured to include an upstream PCI-PCI bridge 1041 connected in a direction of the route complex and downstream PCI-PCI bridges 1042, 1043 and 1044 connected in a direction of the endpoints. A PCI express switch internal bus 1045 connects the PCI-PCI bridges to one another.

As a packet (TLP: Transaction Layer Packet) transferred on the internal bus 1045 in the PCI express system shown in FIG. 19 or on the internal bus 1045 of the PCI express switch 104 shown in FIG. 20, a PCI express frame managed in an address space of the CPU 101 is used. In the present specification, this frame is referred to as "TLP frame". In the PCI express, two types of routing methods, that is, address routing and ID routing are defined as a technique for identifying a transfer destination of the TLP frame from notation of a header of the TLP frame. The address routing is a technique for identifying a destination by designating an I/O space or a memory space allocated to an endpoint or the like as the destination. A frame format for the address routing is described in Non-Patent Document 3. The ID routing is a technique for identifying a destination by designating a bus number of a bus to which the destination is connected, a device number allocated to identify a device on the same bus, and a function number allocated to a function in the device. A frame format for the ID routing is described in Non-Patent Document 4. In the present specification, the I/O space or memory space and the bus number, device number and function number for identifying the destination will be generically referred to as "destination address space".

FIG. 21 shows a format of an address routing frame (address routing TLP frame). In data transfer using the address routing TLP frame, a data area at Address [31:2] of Byte 8 is employed as the destination address space. If this frame is input onto the PCI express switch 104 shown in FIG. 20, all the PCI-PCI bridges connected onto the PCI express switch internal bus 1045 receive this frame. Further, among the bridges, the bridge to which a device corresponding to Address [31:2] described in the frame is connected, transfers this frame to the device. Generally, the CPU 101 sets addresses corresponding to devices connected to the bridges so as not to overlap one another. Accordingly, one PCI-PCI bridge transfers the frame.

FIG. 22 shows a format of an ID routing frame (ID routing TLP frame). In data transfer using the ID routing TLP frame, a bus number, a device number and a function number at Byte 8 are employed as the destination address space. If this frame is input onto the PCI express switch 104 shown in FIG. 20, all the PCI-PCI bridges connected onto the PCI express switch internal bus 1045 receive the TLP frame. Further, the bridge connected to a device corresponding to the bus number, device number and function number of the TLP frame transfers this TLP frame to the device. Furthermore, the CPU 101 sets bus numbers, device numbers and function numbers used in the ID routing so as not to overlap one another among a plurality of devices. Accordingly, one PCI-PCI bridge transfers the TLP frame.

In the PCI express system shown in FIG. 19, an arbitrary one of a plurality of endpoints can be connected to the CPU 101. However, a frame transfer method and a PCI express switch configuration on the premise that only one CPU is connected are applied to this system, so that a plurality of CPUs cannot be connected. Due to this, endpoints cannot be shared among a plurality of CPUs.

As a technique for solving the above-stated problem, there are known two related techniques as follows.

One is advanced switching interconnect (ASI) for distributing and connecting a plurality of CPUs and a plurality of endpoints in a network and dynamically setting connection among them. Non-Patent Document 5 describes an example of the ASI.

FIG. 23 typically shows a system described in the Non-Patent Document 5. As shown in FIG. 23, an ASI network 1301 includes the following constituent elements. Route complex-side PCI express-ASI bridges 1302 and 1303 are connected to corresponding route complexes 102 and 109, respectively and each of the bridges 1302 and 1303 transmits or receives an ASI packet obtained by encapsulating a TLP frame. An ASI switch 1304 transfers the ASI packet to a port to which a destination of the ASI packet is connected. Endpoint-side PCI express-ASI bridges 1305 to 1307 are connected to endpoints 105 to 107, respectively and each of the bridges 1305 to 1307 transmits or receives the ASI packet obtained by encapsulating a TLP frame. A fabric manager 1308 manages connection between the route complex-side PCI express-ASI bridges 1302 and 1303 and the endpoint-side PCI express-ASI bridges 1305 to 1306.

The other related technique is a technique for using a settable PCI express switch. Patent Document 1 describes an example of the other related technique.

FIG. 24 typically shows a system described in the Patent Document 1. FIG. 25 shows a configuration of the PCI express switch used in the system. Referring to FIG. 25, a settable PCI express switch 111 includes the following constituent elements. Upstream PCI-PCI bridges 1111 and 1112 are connected to route complexes 102 and 109, respectively. Downstream PCI-PCI bridges 1113 to 1115 are connected to endpoints 105 to 107, respectively. A PCI express switch internal bus 1116 connects the upstream PCI-PCI bridge 1111 to the downstream PCI-PCI bridges 1113 to 1115. A PCI express switch internal bus 1117 connects the upstream PCI-PCI bridge 1112 to the downstream PCI-PCI bridges 1113 to 1115. A bridge controller logic 1118 controls connection relationship between the PCI express switch internal buses 1116 and 1117 and the downstream PCI-PCI bridges 1113 to 1115.

A network system using the PCI express will next be described.

FIG. 26 shows an example of an ordinary network system using the PCI express. In this network system, network forwarding engines 402 to 404 connected to ports 1 to 3, respectively are connected to one another by a network switch 401. The network forwarding engines 402 to 404 analyze destinations of network data input from the ports 1 to 3, respectively. The network switch 401 executes two operations of unicast transfer for transferring data to one certain port and multicast transfer for transferring data to a plurality of specific ports.

Moreover, in the system shown in FIG. 26, if a destination of transfer data is unknown, a CPU 101 performs a protocol analysis and then performs routing-transfer. To this end, a PCI express switch 104 connects a route complex 102 of CPU 101 to the network forwarding engines 402 to 404.

[Patent Document 1] Japanese Patent Application Laid-Open No. 2005-317021

[Non-Patent Document 1] PCI Express Base Specification Revision 1.1, PCI-SIG, Mar. 28, 2005, pp. 30

[Non-Patent Document 2] PCI Express Base Specification Revision 1.1, PCI-SIG, Mar. 28, 2005, pp. 34

[Non-Patent Document 3] PCI Express Base Specification Revision 1.1, PCI-SIG., Mar. 28, 2005, pp. 52-53

[Non-Patent Document 4] PCI Express Base Specification Revision 1.1, PCI-SIG., Mar. 28, 2005, pp. 54

[Non-Patent Document 5] Protocol Interface #8 (PI-8) R1.0, ASI-SIG, February 2004, pp. 7-11.

SUMMARY OF INVENTION

The above-stated PCI express system has problems as will be described below.

The first problem is that devices (such as the CPU) connected to the route complex cannot hold communication between the devices in the system using the PCI express shown in FIG. 25. The reason is as follows. In the settable PCI express switch 111, the internal bus 1116 is completely separated from the internal bus 1117. Due to this, there exists no path that connects the upstream PCI-PCI bridge 1111 connected to the route complex 102 to the upstream PCI-PCI bridge 1112 connected to the route complex 109.

The second problem is that devices (such as CPUs) connected to different route complexes cannot broadcast data to the same endpoint in the system using the PCI express shown in FIG. 25. The reason is that the downstream PCI-PCI bridges 1113 to 1115 are connected to the internal buses 1116 and 1117 in an alternative way in the settable PCI express switch 111. If the endpoint 105 is connected to the route complex 102-side PCI express switch internal bus 1116, a CPU 108 is unable to transmit data to the endpoint 105.

The third problem is that the PCI express switch shown in FIG. 26 does not include a multicast transfer function with respect to specific devices. Due to this, two types of switches, that is, the network switch 401 and the PCI express switch 104 are necessary. This disadvantageously makes a system configuration complicated, increases cost and makes system operation complex.

If the ASI network 1301 shown in FIG. 23 is used, communication between the devices (such as the CPU) connected to one route complex and broadcast communication and multicast communication from the devices (such as the CPUs) connected to different route complexes to the same endpoint can be established. However, a processing for encapsulating frames is required, so that it is difficult to reduce delay time during data transfer. Besides, another problem occurs that circuit scale is made large.

The present invention has been made in the above-stated circumstances. It is an object of the present invention to provide a switch for transmitting and receiving a TLP frame complying with the PCI express among a plurality of devices without encapsulating the TLP frame and a system using the switch.

A switch according to the present invention includes: a plurality of bridges transmitting and receiving a TLP frame complying with PCI express between devices connected to the plurality of bridges, respectively; a switch forwarding mechanism including a plurality of ports to which the plurality of bridges are connected, respectively, selecting an output port in dependence on a combination of destination information on the TLP frame input from one of the plurality of ports and the port which input the TLP frame, and outputting the TLP frame from the selected output port.

A system according to the present invention includes: the switch; and a first PCI express bus and a second PCI express bus being connected to the switch and the different devices.

According to the present invention, in the system using the PCI express, communication can be held between such devices as CPUs without a frame encapsulation processing. This can thereby prevent an increase in delay during data transfer and an LSI circuit scale from being made large.

BRIEF DESCRIPTION OF DRAWINGS

{FIG. 4} is an explanatory diagram of a group ID management table memory according to the embodiment of the present invention.

{FIG. 8} is an explanatory diagram of an extension address routing table memory according to the embodiment of the present invention.

{FIG. 9} is an explanatory diagram of an extension ID routing table memory according to the embodiment of the present invention.

{FIG. 10} is an explanatory diagram of a multicast table memory according to the embodiment of the present invention.

{FIG. 13} is an explanatory diagram of the extension address routing table memory used for CPU-CPU communication according to the embodiment of the present invention.

{FIG. 14} is an explanatory diagram of the group ID management table memory used if a plurality of CPUs shares endpoints according to the embodiment of the present invention.

{FIG. 16} is an explanatory diagram of the extension address routing table memory used if a plurality of CPUs shares an endpoint according to the embodiment of the present invention.

304: PCI express extension switch
20: PCI express packet switch forwarding mechanism
3041, 3042, 3043, 3044, 3045: PCI-PCI bridge
11, 12, 13, 14, 15: PCI express bus
102, 109: Route complex
105 to 107: Endpoint
30: Control CPU
3040: External control interface

DESCRIPTION OF EMBODIMENTS

Modes for carrying out the present invention will be described hereinafter in detail with reference to the drawings.

Figure 1:
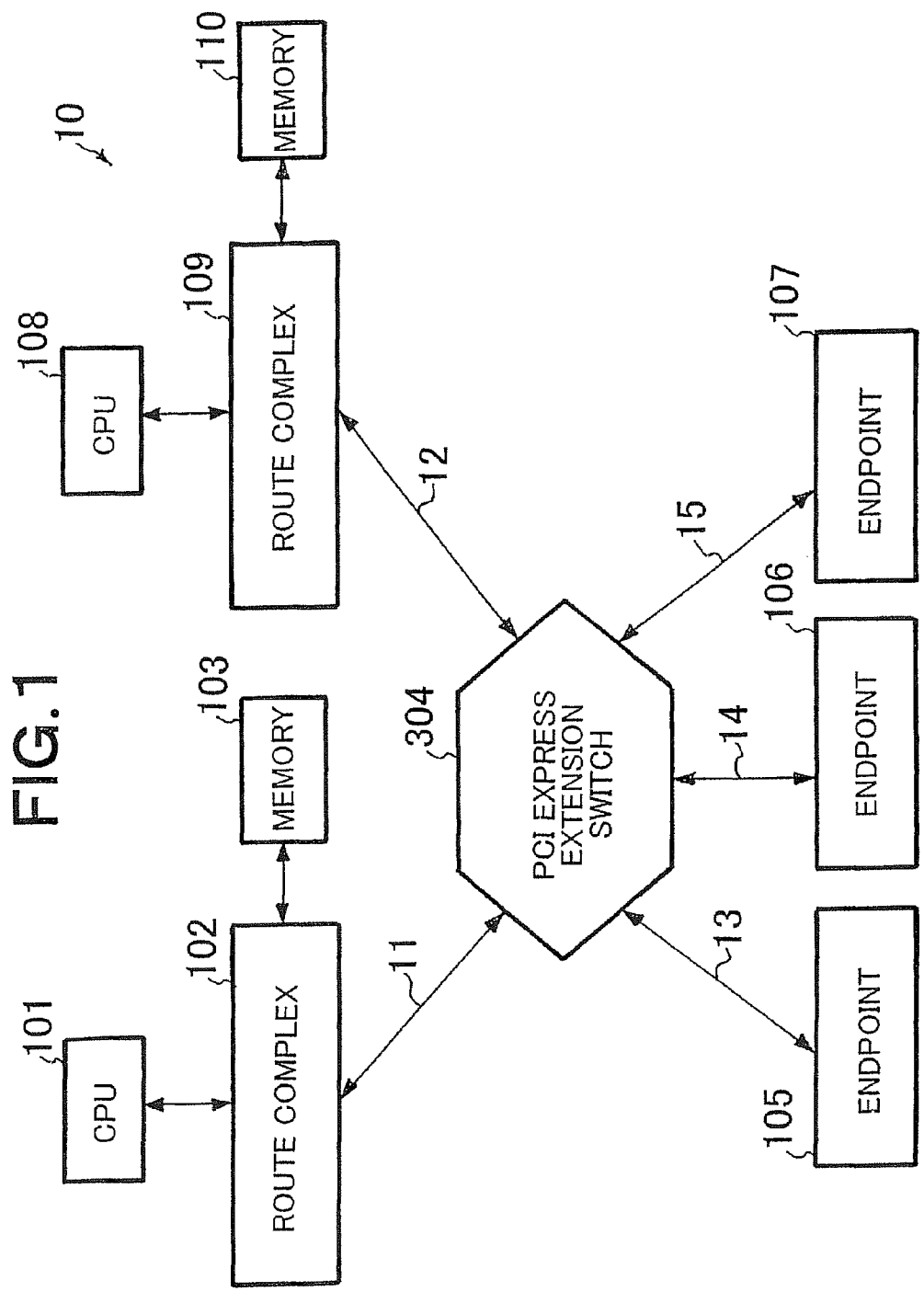
{FIG. 1} is a block diagram showing a configuration of a system using a switch according to an embodiment of the present invention.

FIG. 1 shows a configuration of a system according to an embodiment of the present invention. A PCI express system 10 is configured so that a plurality of route complexes 102 and 109 and a plurality of endpoints 105 to 107 are connected to a PCI express extension switch 304 corresponding to a switch according to the present invention via PCI express buses 11 to 15, respectively. A CPU 101 and a memory 103 are connected to the route complex 102 whereas a CPU 108 and a memory 110 are connected to the route complex 109.

Figure 21:
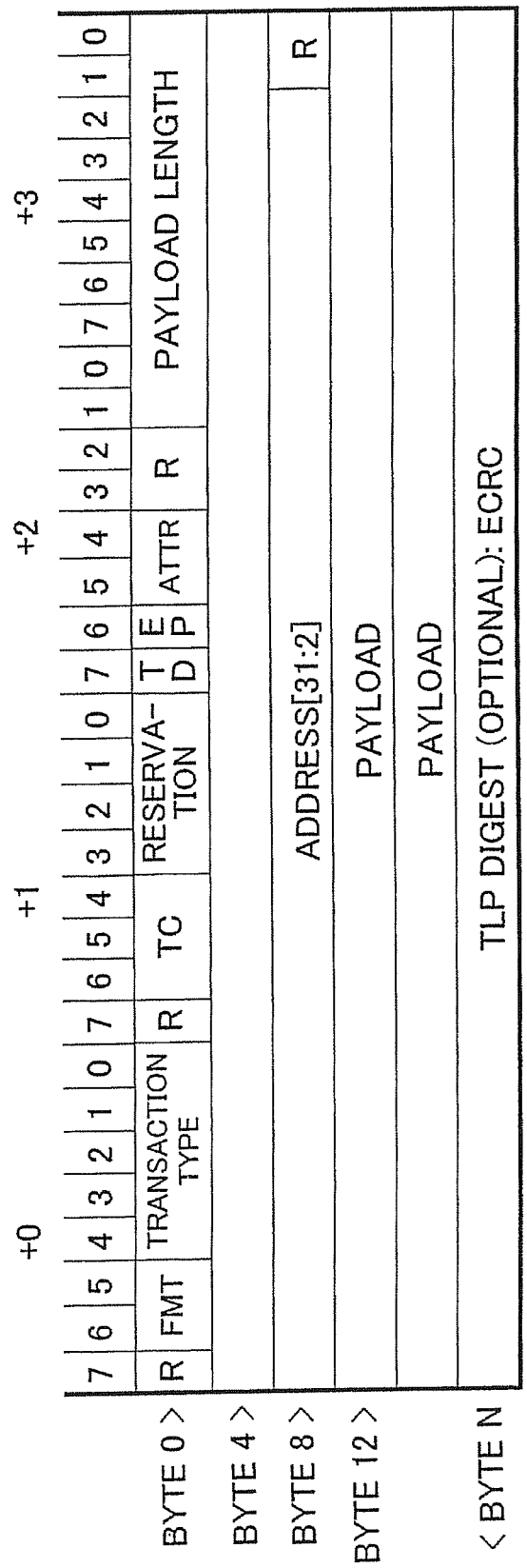
{FIG. 21} is an explanatory diagram related to a format of an address routing frame complying with PCI express.
Figure 22:
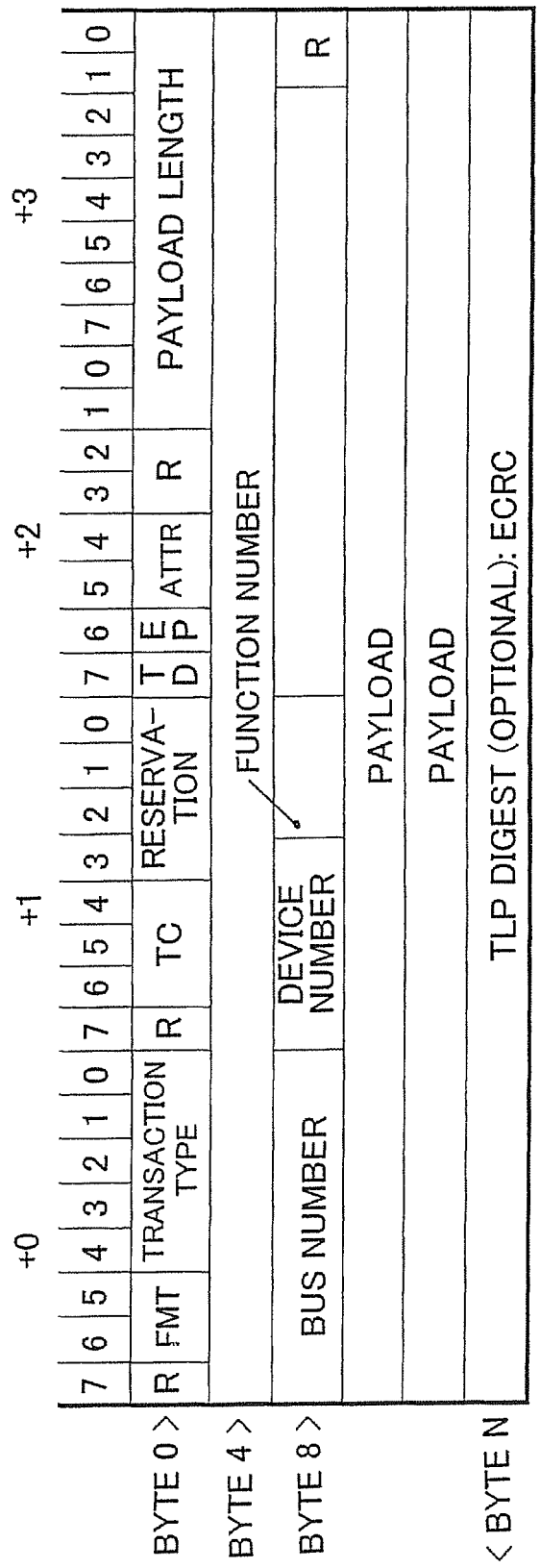
{FIG. 22} is an explanatory diagram related to a format of an ID routing frame complying with the PCI express.
Figure 23:
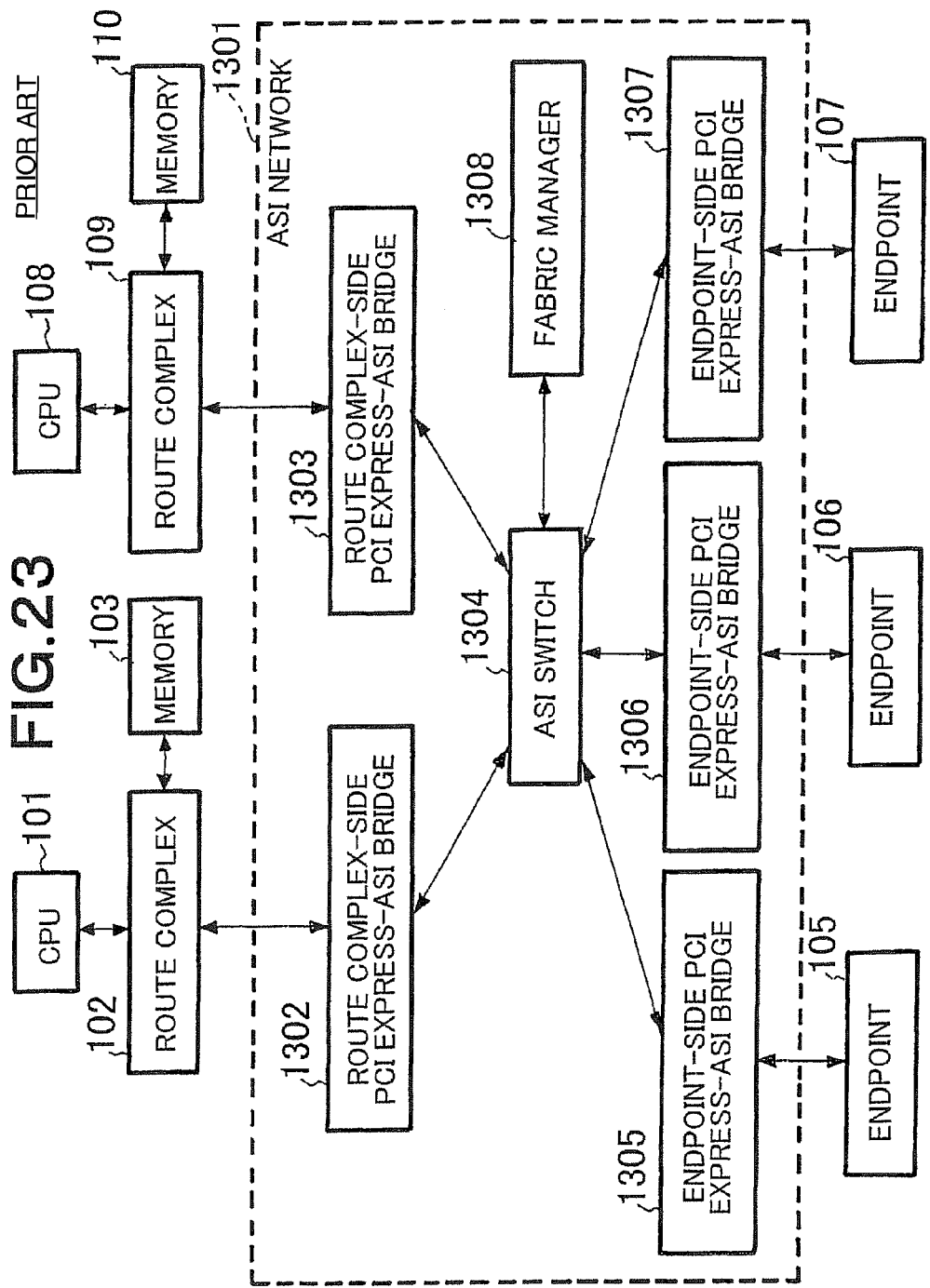
{FIG. 23} is a block diagram showing a configuration of an ASI network based on Non-Patent Document 5.
Figure 24:
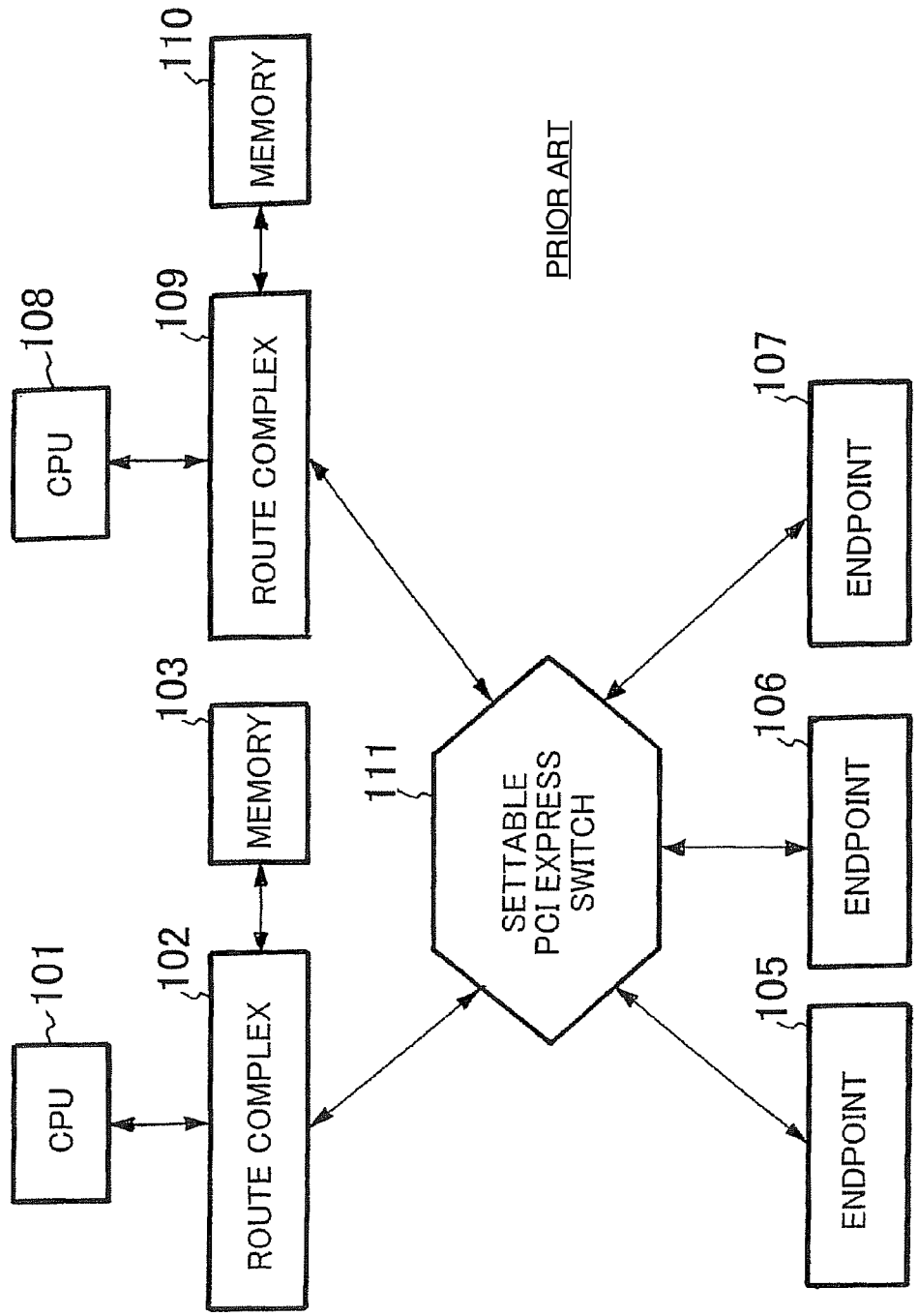
{FIG. 24} is a block diagram showing a configuration of a system based on Patent Document 1.

Each of the route complexes 102 and 109 and the endpoints 105 to 107 is a device complying with the PCI express and including a function of holding data communication using an address routing TLP frame shown in FIG. 21 and an ID routing TLP frame shown in FIG. 22.

Figure 2:
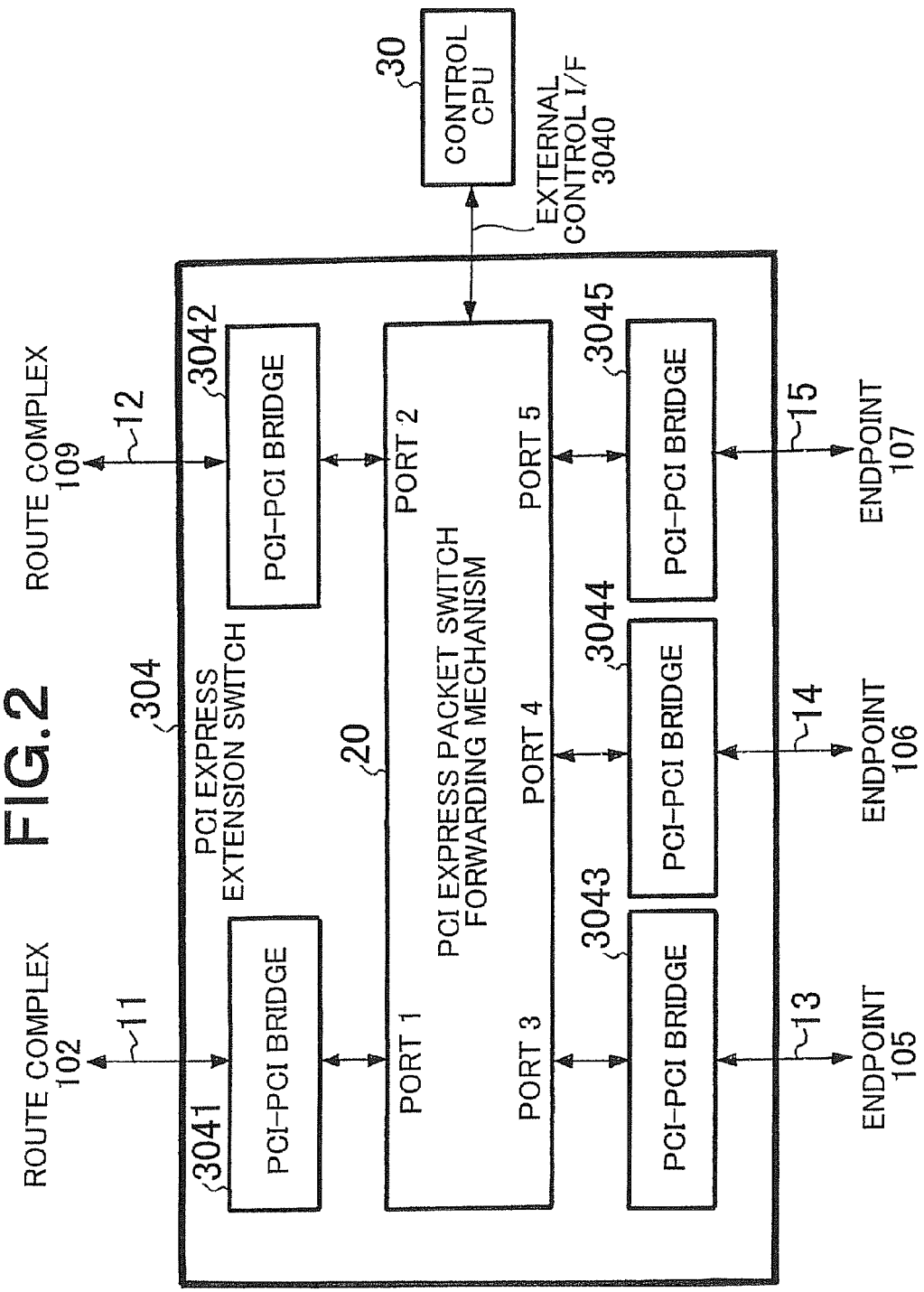
{FIG. 2} is a block diagram showing an internal configuration of a PCI express extension switch according to the embodiment of the present invention.

FIG. 2 shows a configuration of the PCI express extension switch 304. The PCI express extension switch 304 is configured to include a PCI-PCI bridge 3041 connected to the route complex 102 by the PCI express bus 11, a PCI-PCI bridge 3042 connected to the route complex 109 by the PCI express bus 12, a PCI-PCI bridge 3043 connected to the endpoint 105 by the PCI express bus 13, a PCI-PCI bridge 3044 connected to the endpoint 106 by the PCI express bus 14, a PCI-PCI bridge 3045 connected to the endpoint 106 by the PCI express bus 15 and a PCI express packet switch forwarding mechanism 20 connected to these bridges 3041 to 3045.

The PCI express packet switch forwarding mechanism 20 includes a plurality of ports serving as input/output interfaces to which the PCI-PCI bridges 3041 to 3045 can be connected, respectively. The PCI-PCI bridge 3041 is connected to a port 1, the PCI-PCI bridge 3024 is connected to a port 2, the PCI-PCI bridge 3043 is connected to a port 3, the PCI-PCI bridge 3044 is connected to a port 4 and the PCI-PCI bridge 3045 is connected to a port 5.

Figure 20:
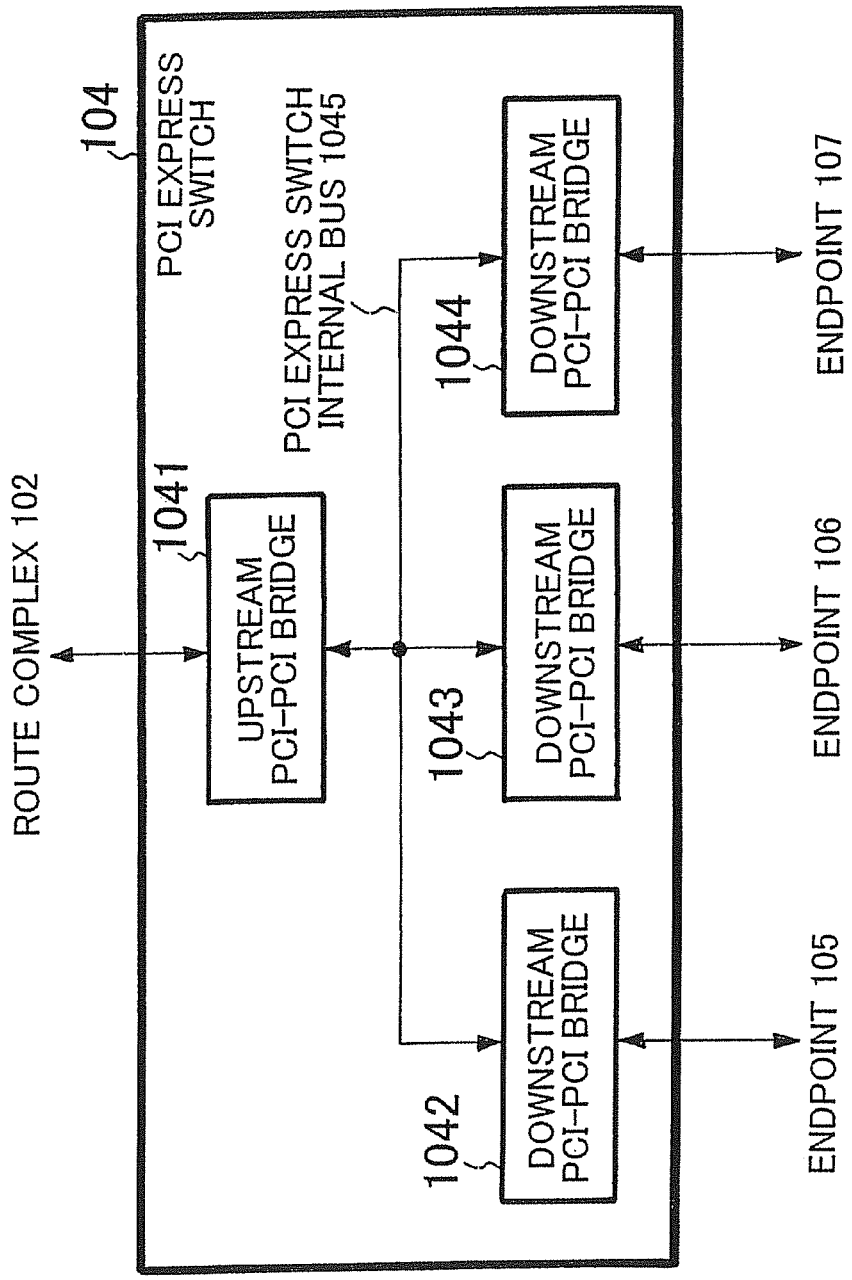
{FIG. 20} is a block diagram showing a configuration of a system based on Non-Patent Document 2.
Figure 25:
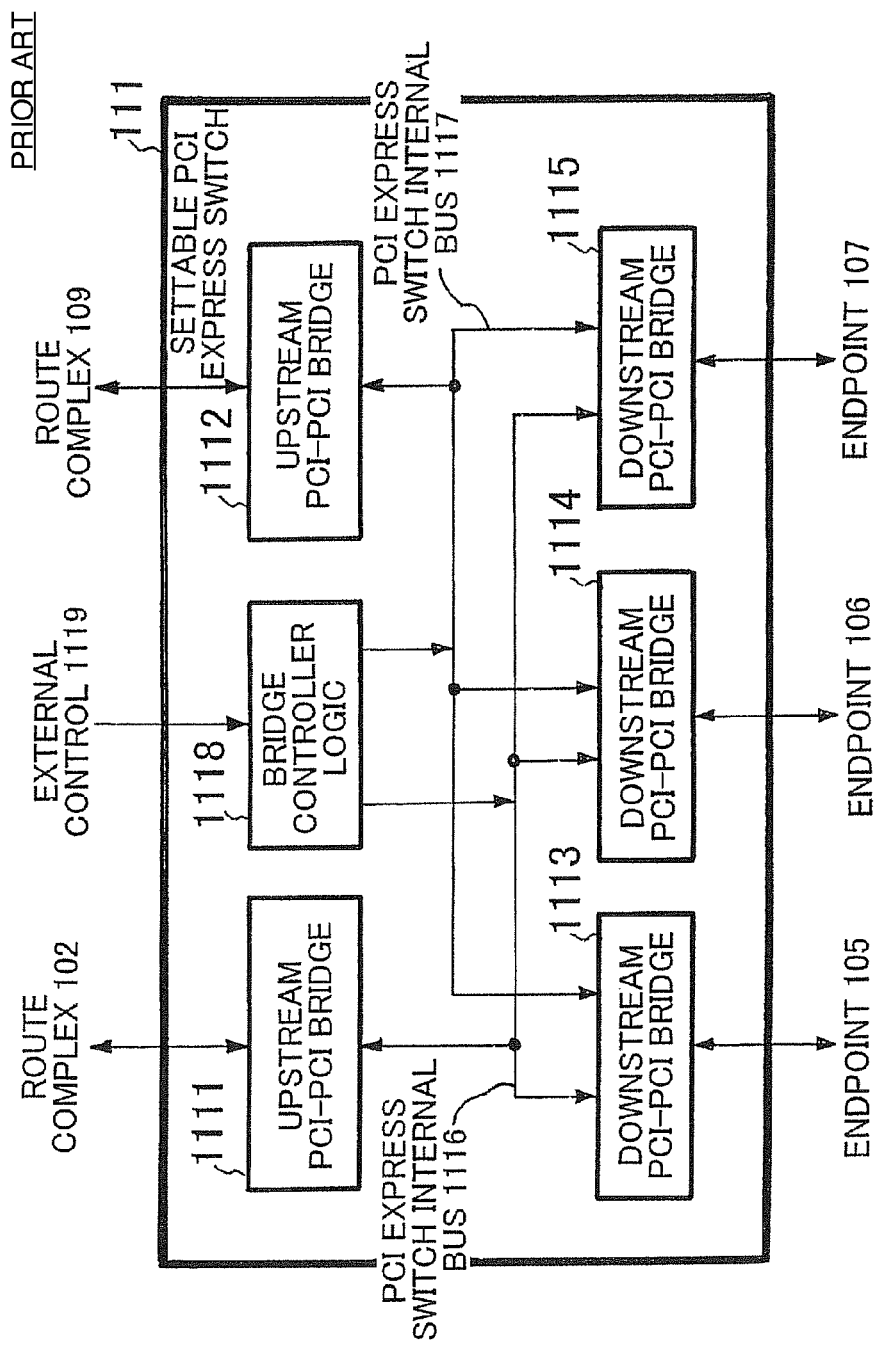
{FIG. 25} is a block diagram showing an internal configuration of a switch in the system based on the Patent Document 1.

Each of the PCI-PCI bridges 3041, 3042 and 3043 to 3045 is a device including an equivalent function to those of the upstream PCI-PCI bridge and the downstream PCI-PCI bridges in the PCI express switch according to the related technique to the present invention as shown in, for example, FIG. 20 or 25. However, the PCI-PCI bridges 3041, 3042 and 3043 to 3045 differ from the upstream and downstream PCI-PCI bridges according to the related technique in the following respect. While the upstream and downstream PCI-PCI bridges according to the related technique are connected to one another by the PCI express switch internal bus or buses, the PCI-PCI bridges 3041 to 3045 are connected to one another by the PCI express packet switch forwarding mechanism 20. Each of the bridges 3041 to 3045 transmits the address routing TLP frame shown in FIG. 21 or the ID routing TLP frame shown in FIG. 22 to the connected port of the PCI express packet switch forwarding mechanism 20 and also receives a TLP frame similar in format to those frames from the connected port.

The PCI express packet switch forwarding mechanism 20 receives the above-stated address routing TLP frame or ID routing TLP frame from each of the ports 1 to 5 to which the PCI-PCI bridges 3041 to 3045 are connected, respectively. Furthermore, the PCI express packet switch forwarding mechanism 20 selects one of the ports (1 to 5) to be used to output the frame by checking a destination address space set in a header of the frame and system set information set in the mechanism (20) with an information table to be described later. The destination address space set in the header of the frame means herein address information if the frame is the address routing TLP frame shown in FIG. 21. Alternatively, the destination address space set in the header of the frame means a bus number, a device number and a function number if the frame is the ID routing TLP frame shown in FIG. 22. The system set information can be set from a control CPU 30 connected to the PCI express packet switch forwarding mechanism 20 via an external control interface 3040. As the external control interface 3040 to which the control CPU 30 can be connected, a PCI express interface to which an SMBus, 12C bus, the PCI-PCI bridge 3041 or the like is connected can be employed.

Figure 3:
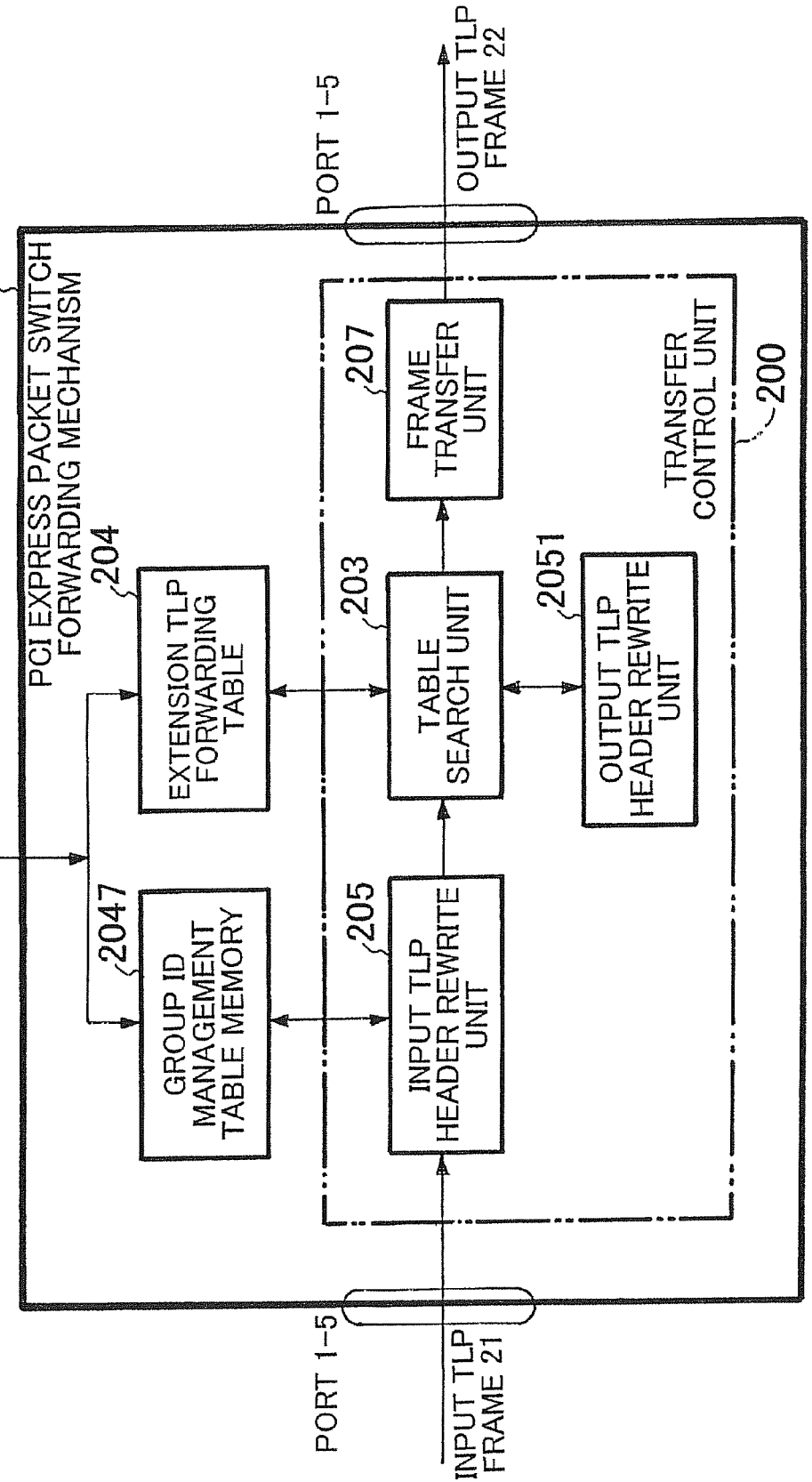
{FIG. 3} is a block diagram showing an internal configuration of a PCI express packet switch forwarding mechanism in the embodiment of the present invention.

FIG. 3 shows a configuration of the PCI express packet switch forwarding mechanism 20. A group ID management table memory 2047 and an extension TLP forwarding table 204 constitute storage means for holding the system set information input via the external control interface 3040. A transfer control unit 200 selects one of the ports (1 to 5) for outputting an input TLP frame 21 received from the ports 1 to 5 based on the destination address space set in the header of the frame and the system set information, and outputs an output TLP frame 22 from the selected port. The transfer control unit 200 is configured to include an input TLP header rewrite unit 205, a table search unit 203, a frame transfer unit 207 and an output TLP header rewrite unit 2051.

The group ID management table memory 2047 is a memory storing therein information such as correspondence between the ports 1 to 5 and group IDs. FIG. 4 shows an example of a content of the group ID management table memory 2047. As shown in FIG. 4, the group ID management table memory 2047 includes table entries corresponding to port numbers by one-to-one correspondence. A group ID, a port attribute and a device attribute corresponding to each port number are recorded in each table entry corresponding to the port number.

A role of group IDs is to group devices (such as the CPUs and the endpoints) of the system 10 into device groups each sharing the same memory space. In an ordinary PCI express system, allocation and management of memory spaces are responsible for route complex-side devices, so that a plurality of route complex-side devices does not share one memory space. Therefore, as shown in FIG. 4, different group IDs "1" and "2" are set to port numbers "1" and "2", respectively. In this way, different group IDs are set to a plurality of ports to which the route complex-side devices are connected, respectively so as to avoid address conflict. On the other hand, the same group ID as that of a specific CPU is set to the ports, which correspond to device used only by a specific CPU, among the ports to which the endpoint-side devices are connected, respectively. In FIG. 4, the group ID "1" is set to a port number "3" and the group ID "2" is set to both of port numbers "4" and "5". This setting is made so that only the CPU 101 uses the endpoint 105 shown in FIG. 1 and that only the CPU 108 uses the endpoints 106 and 107. Furthermore, although not shown in FIG. 4, if a certain endpoint-side device is shared by a plurality of CPUs, a dedicated group ID to the device is set to the device.

In the present embodiment, each group ID is constituted by four bits. This is because a four-bit reservation area is used as a TLP header area for setting a group ID in the present embodiment. Provided that a reservation area of five or more bits can be used, an area of five or more bits may be allocated to each group ID.

Each port attribute and each device attribute stored in the group ID management table memory 2047 indicate a type of a device connected to one port from different viewpoints. Namely, the port attribute indicates which of two types of devices, that is, the route complex or endpoint and the switch (PCI express extension switch), is connected to a port. Specifically, if a device is the route complex or endpoint, a value "0" is set to a port attribute of the device. If the device is the switch (PCI express extension switch), a value "1" is set to the port attribute of the device. On the other hand, the device attribute indicates which of three types of devices, that is, the route complex, the endpoint and the other bridge such as the switch is connected to a port. Specifically, if a device is the route complex, a value "0" is set to a device attribute of the device. If the device is the endpoint, a value "1" is set to the device attribute of the device. If the device is the bridge, a value "2" is set to the device attribute of the device. Roles and utilization methods of the port attribute and the device attribute will be described later.

The input TLP header rewrite unit 205 is a unit writing the group ID corresponding to the port to which the input TLP frame 21 is input to the reservation area of the header of the input TLP frame 21 while referring to the group ID management table memory 2047. The address routing TLP frame or ID routing TLP frame to which the group ID is set will be referred to as "extension address routing TLP frame" and "extension ID routing TLP frame" in the present specification.

Figure 5:
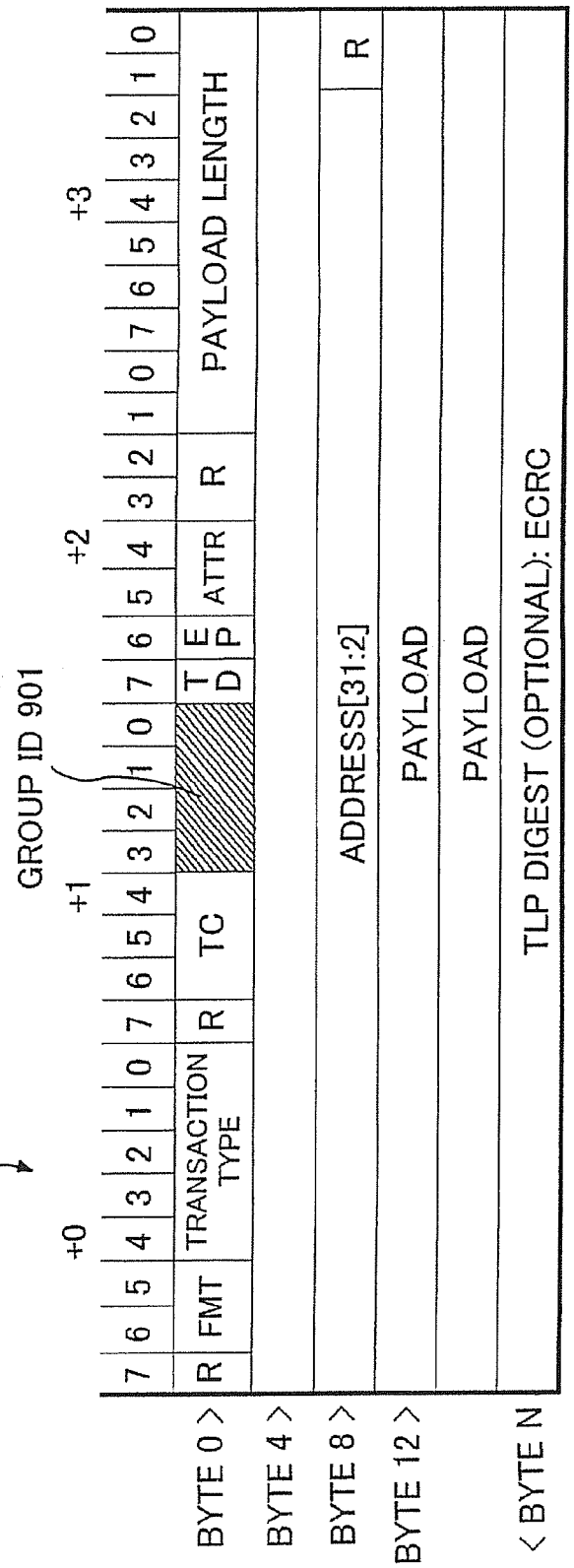
{FIG. 5} is an explanatory diagram of an extension address routing TLP frame according to the embodiment of the present invention.
Figure 6:
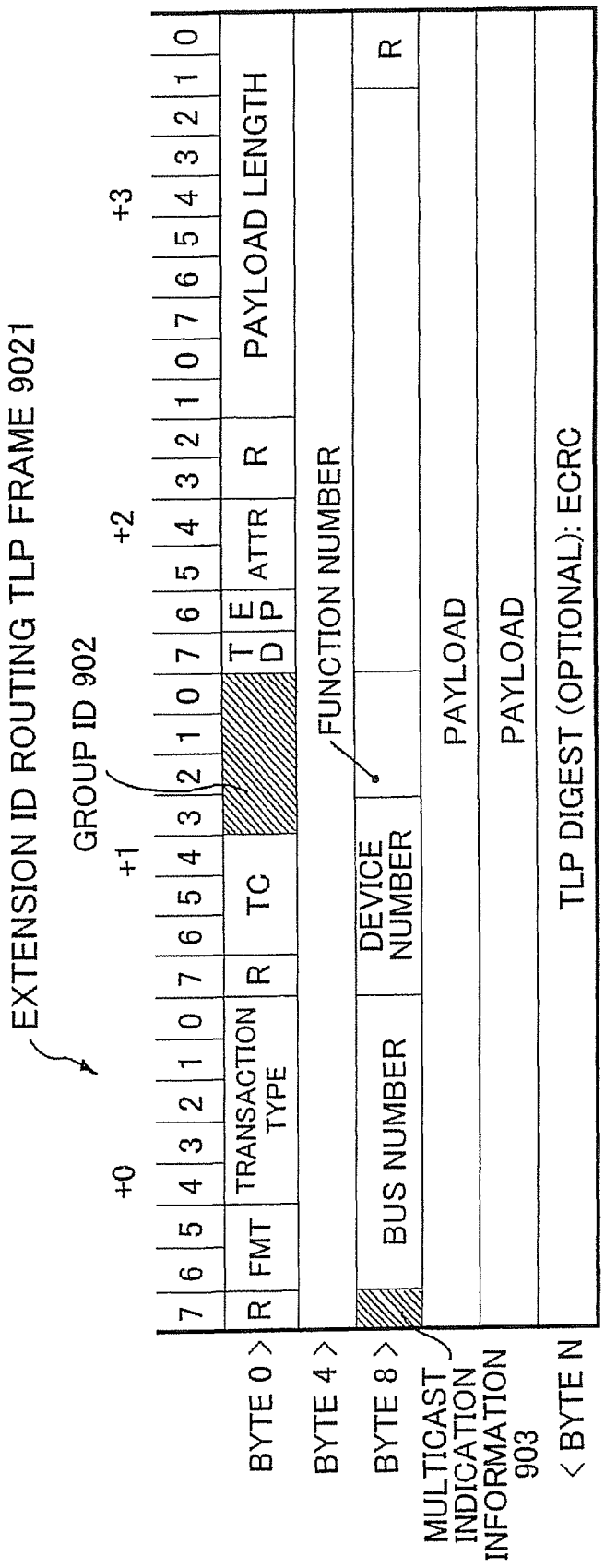
{FIG. 6} is an explanatory diagram of an extension ID routing TLP frame according to the embodiment of the present invention.

FIG. 5 shows a frame format of the extension address routing TLP frame. FIG. 6 shows a frame format of the extension ID routing TLP frame. These formats are similar in basic configuration to those shown in FIGS. 21 and 22, respectively. An address or a bus number and the like are set to Byte 8 of the extension address routing TLP frame or the extension ID routing TLP frame as frame destination information, respectively. As shown in FIGS. 5 and 6, in the extension address routing TLP frame and the extension ID routing TLP frame according to the present embodiment, group IDs 901 and 902 stated above are written to four-bit reservation areas each set to Address [19:16] of Byte 0, respectively. Furthermore, as shown in FIG. 6, multicast indication information 903 is set to one-bit Address [31] (corresponding to one bit of the bus number) at Byte 8 of the extension ID routing TLP frame. In the present embodiment, a frame to which the multicast indication information 903 having a value "1" is set is dealt with as a multicast transfer frame.

Figure 7:
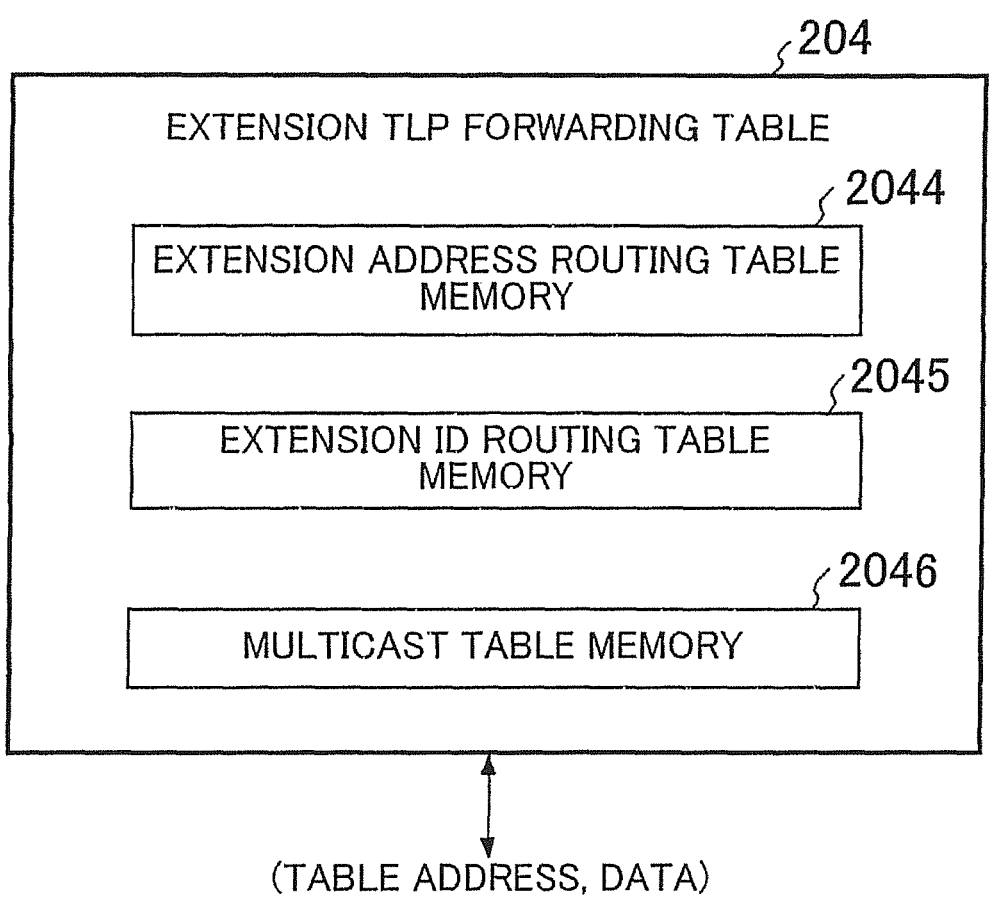
{FIG. 7} is an explanatory diagram of an extension TLP forwarding table according to the embodiment of the present invention.

The extension TLP forwarding table 204 holds routing information for deciding a transfer destination of a frame the header of which is rewritten by the input TLP header rewrite unit 205, that is, the extension address routing TLP frame and extension ID routing TLP frame. FIG. 7 shows a configuration of the extension TLP forwarding table 204. An extension address routing table memory 2044 holds routing information for deciding the transfer destination of the extension address routing TLP frame. An extension ID routing table memory 2045 holds routing information for deciding the transfer destination of the extension ID routing TLP frame to which the multicast indication information 903 having a value "0" (non-multicast) is set. A multicast table memory 2046 holds routing information for deciding the transfer destination of the extension ID routing TLP frame to which the multicast indication information 903 having the value "1" (multicast) is set.

FIG. 8 shows an example of a content configuration of the extension address routing table memory 2044. Information of the extension address routing table memory 2044 is constituted by a plurality of table entries. A lower limit and an upper limit of a TLP destination address space, a group ID, output port information and address swap offset information are recorded in each table entry. The lower limit and upper limit of the TLP destination address space are items to be compared with a value of the destination address set as destination information on the TLP frame. Namely, the lower limit and upper limit of the TLP destination address space shown in FIG. 8 are items to be compared with the address described at [31:2] of Byte 8 in the extension address routing TLP frame shown in FIG. 5. Further, the group ID shown in FIG. 8 is an item to be compared with the group ID 901 at Byte 0 shown in FIG. 5. The output port information recorded in the extension address routing table memory 2044 is a port number of a port from which the extension address routing TLP frame having an address and a group ID coincident with those recorded in the table (2044) is output. The address swap offset information indicates an offset value to be added to the address of the TLP frame to be output. This address swap offset information is set when the TLP frame is transmitted or received between the CPUs if it is necessary to do so.

FIG. 9 shows a content configuration of the extension ID routing table memory 2045. The extension ID routing table memory 2045 is constituted by a plurality of table entries. A bus number, a device number, a function number, a group ID and output port information are recorded in each table entry. Among these items, the bus number, the device number, the function number and the group ID are items to be compared with the bus number, the device number and the function number (Byte 8) serving as the destination information on the extension ID routing TLP frame shown in FIG. 6 and the group ID 902 (Byte 0) of the extension ID routing TLP frame, respectively. The output port information is a port number of a port from which the extension ID routing TLP frame having the above-stated items coincident with those recorded in the table (2045) is output.

FIG. 10 shows a content configuration of the multicast table memory 2046. The multicast table memory 2046 is referred to if the multicast indication information 903 (FIG. 6) on the extension ID routing TLP frame received by the switch indicates "multicast". The multicast table memory 2046 is constituted by a total of 32768 table entries corresponding to memory addresses from "0x0000" to "0x7FFF" by one-to-one correspondence. Plural output port information that is a set of bits corresponding to ports by one-to-one correspondence is recorded in each table entry. If an output destination of the extension ID routing TLP frame to which the multicast indication information 903 having the value "1" is set is to be decided, 15-bit information constituted by the bus number (seven bits), the device number (five bits) and the function number (three bits) in the extension ID routing TLP frame is compared with the "memory addresses" shown in FIG. 10. Further, the plural output port information recorded in the entry coincident with the "memory address" is selected and the ports corresponding to the values "1" of the plural output port information are decided as output ports.

The table search unit 203 receives the extension address routing TLP frame or the extension ID routing TLP frame from the input TLP header rewrite unit 205, and decides a transfer destination of the TLP frame from the extension TLP forwarding table 204 in dependence on the type of the TLP frame. Moreover, the table search unit 203 determines whether or not it is necessary to rewrite the header of the TLP frame to be output and, if necessary, the header of the TLP frame is rewritten by the output TLP header rewrite unit 2051. The output TLP frame 22 is output from the decided output port through the frame transfer unit 207.

The output TLP header rewrite unit 2051 performs a processing for rewriting the header indicated by the table search unit 203. Specifically, the output TLP header rewrite unit 2051 adds an offset value to the address, deletes the group ID in the header and does the other things.

The frame transfer unit 207 performs a processing for outputting the output TLP frame 22 from the port indicated by the table search unit 203. If the output TLP frame 22 is the extension ID routing TLP frame to which the multicast indication information 903 having the value "1" is set, the frame transfer unit 207 outputs the TLP frame from a plurality of ports decided based on the multicast table memory 2046 shown in FIG. 10 in parallel.

Operation according to the present embodiment will next be described.

Settings of the group ID management table memory 2047 (FIG. 4) and the extension TLP forwarding table 204 (FIG. 7) will first be described. In case of the present embodiment, the control CPU 30 accesses the group ID management table memory 2047 and the extension TLP forwarding table 204 via the external control interface 3040 and sets necessary information to the group ID management table memory 2047 and the extension TLP forwarding table 204.

If the group ID management table memory 2047 is set, group IDs are set to the respective ports of the PCI express packet switch forwarding mechanism 20 according to an operation form as to which endpoints (105 to 107) a plurality of CPUs (101 and 108) uses. Furthermore, port attributes and device attributes are set in dependence on types of the devices connected to the respective ports.

In the setting of the extension ID routing table memory 2045 of the extension TLP forwarding table 204, a bus number, a device number and a function number allocated to each device such as the endpoint 105 are set in respective items of the bus number, the device number and the function number of the table (2045) according to the device. Further, a port number of a port to which each device is connected is set in an item of the output port information and a group ID according to the operation form as to which CPU uses the device is set in an item of the group ID. For example, it is assumed that a bus number "Bx", a device number "Dx" and a function number "Fx" are allocated to the device of the endpoint 105 and that the device is used only by the CPU 101. In this case, in one table entry of the extension ID routing table memory 2045, the bus number "Bx", the device number "Dx" and the function number "Fx" are set in the respective items of the bus number, the device number and the function number, a port number "3" is set in the item of the output port information, and a group ID "1" corresponding to the port 1 to which the CPU 101 is connected is set in the item of the group ID.

In the setting of the extension address routing table memory 2044, a lower limit and an upper limit of an address space which can be allocated to each device such as the endpoint 105 are set to respective items of the lower limit and the upper limit of the TLP destination address space in the table 2044. Further, a port number of a port to which each device is connected is set to an item of the output port information and a group ID according to the operation form as to which CPU uses the device is set to an item of the group ID. For example, it is assumed that a lower limit "AL" and an upper limit "AH" of an address space are allocated to the device of endpoint 105 and that the device is used only by the CPU 101. In this case, in one table entry of the extension address routing table memory 2044, the lower limit "AL" and the upper limit "AH" of the address space are set to the respective items of the lower limit and the upper limit of the TLP destination address space, a port number "3" is set to the item of the output port information and a group ID "1" corresponding to the port 1 to which the CPU 101 is connected is set to the item of the group ID. It is to be noted that if the target device is the endpoint as shown in this example, "0" is always set to an item of the address swap offset information in the table (2044).

Referring to FIG. 2, an operation performed when the TLP frame transmitted from one of the route complexes 102 and 109 and the endpoints 105 to 107 is switched by the PCI express extension switch 304 and transferred to the other device among the route complexes (102 and 109) and the endpoints (105 to 107) will be described.

The TLP frame input to the PCI express extension switch 304 from any one device (route complex or endpoint) is input to any one of the ports (1 to 5) of the PCI express packet switch forwarding mechanism 20 via any one of the PCI-PCI bridges (3041 to 3045).

The PCI express packet switch forwarding mechanism 20 performs a switching processing for outputting the input TLP frame from the port decided based on the destination address space in the header of the input TLP frame and the system set information set in the mechanism 20.

Figure 11:
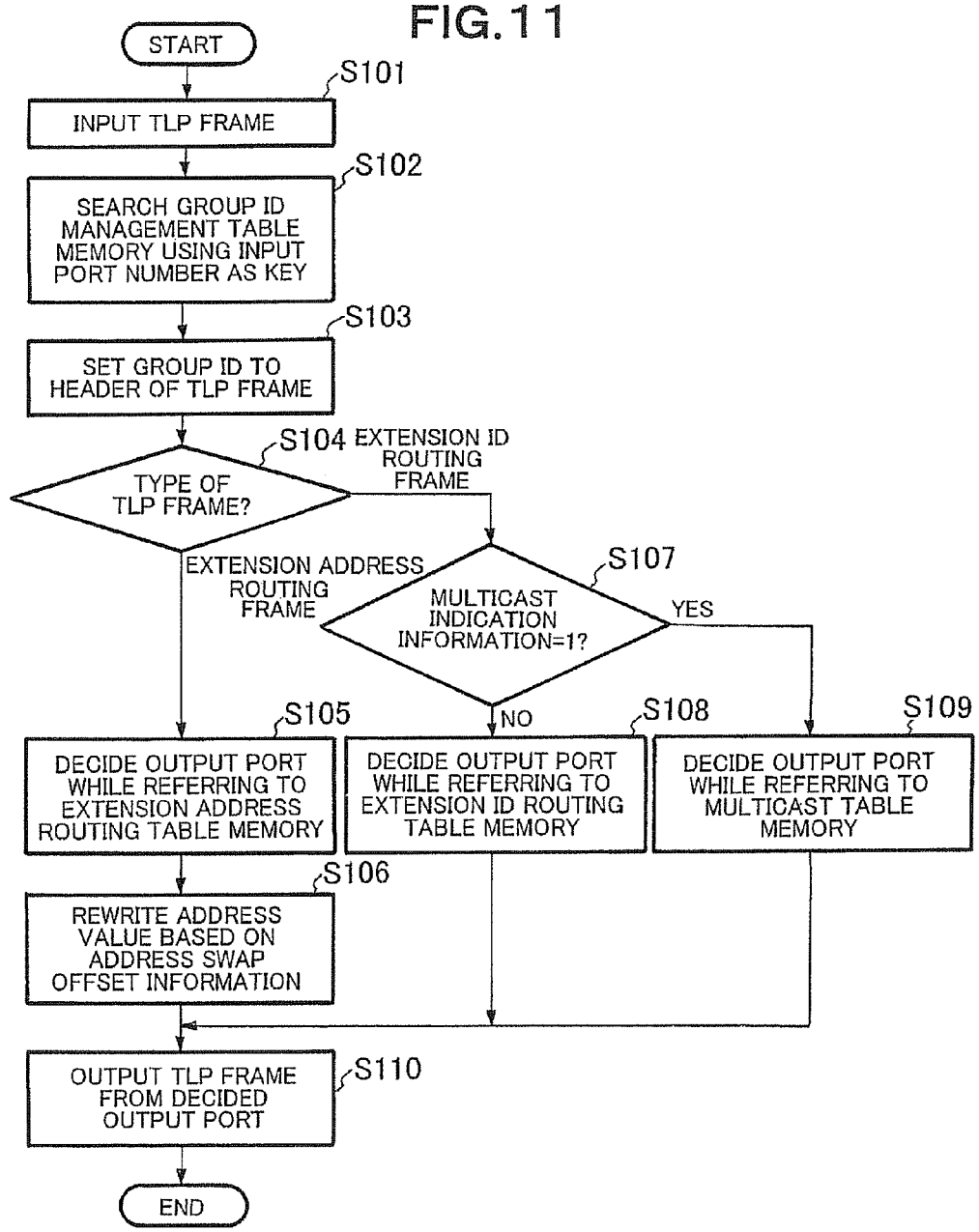
{FIG. 11} is a flowchart showing an operation performed by the PCI express packet switch forwarding mechanism according to the embodiment of the present invention.

Referring to a flowchart shown in FIG. 11, an internal operation performed by the PCI express packet switch forwarding mechanism 20 will be described. If the input TLP frame 21 is input from one certain port (step S101), the input TLP header rewrite unit 205 searches the group ID management table memory 2047 using the port number of the port to which the input TLP frame 21 is input as a key (step S102). By doing this search, the input TLP header rewrite unit 205 acquires contents of the entry in which the group ID corresponding to the port number serving as the key is set. Next, the input TLP header rewrite unit 205 writes the acquired group ID to the header of the input TLP frame 21 (step S103). At this time, if the input TLP frame 21 is the ID routing TLP frame, the extension ID routing TLP frame to which the group ID 902 is set is generated as shown in FIG. 6. If the input TLP frame 21 is the extension address routing TLP frame, the extension address routing TLP frame to which the group ID 901 is set is generated as shown in FIG. 5. The TLP frame generated by the input TLP header rewrite unit 205 is transmitted to the table search unit 203.

Upon receiving the TLP frame, the table search unit 203 discriminates the type of the TLP frame (step S104). If the discriminated type is the extension address routing TLP frame, the table search unit 203 decides the port from which the TLP frame is output while referring to the extension address routing table memory 2044 in the extension TLP forwarding table 204 (step S105). Specifically, the table search unit 203 selects a table entry in which a value of the address [31:2] of Byte 8 of the extension address routing TLP frame falls within an address range from the lower limit to the upper limit of a TLP destination address space of the received TLP frame and in which a value of the group ID 901 coincides with a value of the group ID of the received TLP frame, and decides a port set to the output port information in the table entry as the output port. Furthermore, if offset information other than "0" is set to the address swap offset information in the table entry, the output TLP header rewrite unit 2051 performs a rewrite processing for adding an offset value stored in the offset information to the value of the address [31:2] of Byte 8 of the extension address routing TLP frame (step S106). The frame transfer unit 207 outputs the extension address routing TLP frame from the decided output port (step S110).

If a determination result of the type of the TLP frame indicates that the TLP frame is the extension ID routing TLP frame, the table search unit 203 determines whether a value of the multicast indication information 903 is "1" representing multicast communication (step S107). If the value of the multicast indication information 903 is not "1", the table search unit 203 decides a port from which the TLP frame is output while referring to the extension ID routing table memory 2045 (step S108). Specifically, the table search unit 203 selects a table entry in which values of the bus number, the device number and the function number of the extension ID routing TLP frame coincide with a bus number, a device number and a function number in the table entry, respectively and in which a value of the group ID 902 coincides with a value of the group ID in the table entry. Further, the table search unit 203 decides a port set to the output port information in the table entry as an output port. The frame transfer unit 207 outputs the extension ID routing TLP frame from the decided port (step S110).

Moreover, if a result of the determination as to the multicast indication information 903 (step S107) indicates that the value is "1", the table search unit 203 decides a plurality of ports from which the TLP frame is output while referring to the multicast table memory 2046 (step S109). Specifically, the table search unit 203 searches entries of the multicast table memory 2046 using a 15-bit value constituted by the bus number, the device number and the function number in the extension ID routing TLP frame as a key. Further, the table search unit 203 decides a plurality of ports corresponding to "1" bits, respectively on a bitmap constituting plural output port information in the hit entries as output ports. The frame transfer unit 207 outputs the extension ID routing TLP frame from the decided ports in parallel so as to hold multicast communication (step S110).

In addition to the above-stated basic operation, the PCI express packet switch forwarding mechanism 20 executes additional processes, such as a) and b) to be described later, in dependence on the port attribute set to the group ID management table memory 2047.

a) The PCI express packet switch forwarding mechanism 20 refers to the group ID management table memory 2047 for the port attribute of the port (or each of the ports) decided to output the TLP frame. As a result, if a value of the target port attribute is "0", that is, the device connected to the output port is the route complex or end-point, the table search unit 203 deletes the group ID from the TLP frame to be output using the output TLP header rewrite unit 2051. By doing so, a TLP frame in which the four-bit reservation area set to Byte 0 of the header is rewritten into a blank state is output. The route complex or endpoint can thereby receive the TLP frame similar to the TLP frame received via the conventional PCI express switch. If the value of the port attribute of the output port is "1", that is, the device connected to the output port is the other PCI express extension switch in the system, the group ID is not rewritten differently from the above case.

b) The PCI express packet switch forwarding mechanism 20 refers to the group ID management table memory 2047 for the port attribute of the port to which the TLP frame is input. As a result, if the value of the target port attribute is "1", that is, the device connected to the input port is the other PCI express extension switch in the system, the input TLP frame is a frame in which the group ID is set in the reservation area. In this case, the PCI express packet switch forwarding mechanism 20 recognizes that the TLP frame is the extension address routing TLP frame or the extension ID routing TLP frame and omits the processing for setting the group ID to be performed within the switch (FIG. 11: step S103). On the other hand, if the value of the port attribute of the input port is "0", that is, the device connected to the input port is the route complex or endpoint, the PCI express packet switch forwarding mechanism 20 recognizes that the input TLP frame is the address routing TLP frame or ID routing TLP frame in which no group ID is set in the reservation area similarly to the conventional technique.

By executing the above-stated additional processes a) and b), devices similar to those according to the conventional technique can be connected to the PCI express extension switch 304. Moreover, a plurality of PCI express extension switches 304 can be arranged in the system and the extension address routing TLP frame and the extension ID routing TLP frame can be transferred among those switches 304.

As can be seen, in the PCI express packet switch forwarding mechanism 20, the group ID management table memory 2047 recognizes which of the route complex, the end port and the bridge is connected to each port. The PCI express packet switch forwarding mechanism 20 can thereby grasp whether the port used to input and output a TLP frame is an upstream port to which a route complex-side device is connected or a downstream port to which an endpoint-side device is connected during transfer of the TLP frame.

The PCI express extension switch 304 according to the embodiment can perform various switching operations according to contents of the system set information. The operations will be described more specifically while taking two communications, that is, 1) communication between the CPUs 101 and 108 and 2) communication between the CPU 101 or 108 and the endpoint 105 as examples.

1) Communication Between CPU 101 and CPU 108

Figure 12:
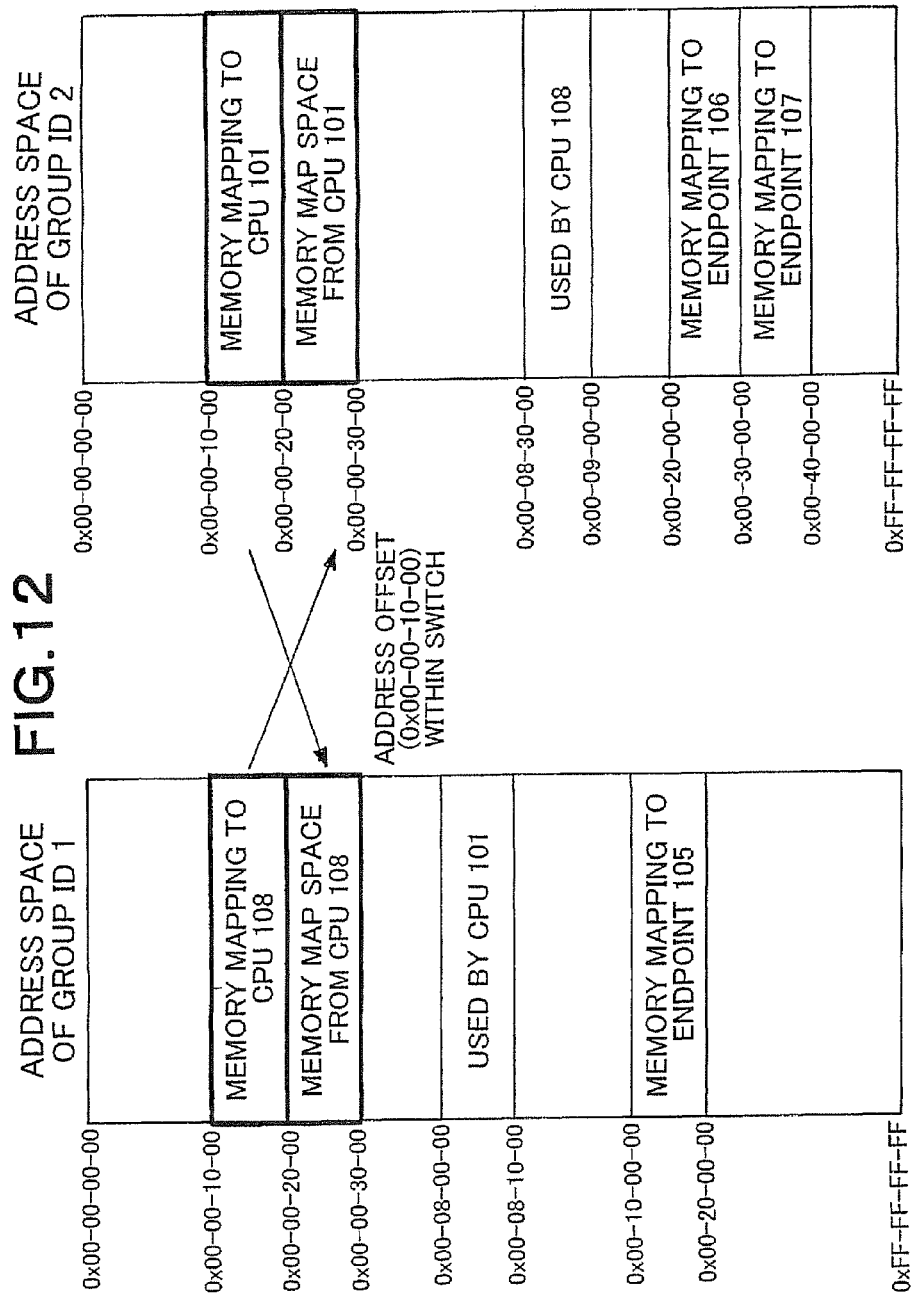
{FIG. 12} is an explanatory diagram related to address spaces managed by a CPU according to the embodiment of the present invention.

FIG. 12 shows an example of settings of an address space managed by the CPU 101 (address space having the group ID "1") and an address space managed by the CPU 108 (address space having the group ID "2"). If a communication is to be held between the CPUs 101 and 108, the CPU 101 memory-maps a part of the address space managed by the CPU 101 to the CPU 108. The CPU 108 similarly memory-maps a part of the address space managed by the CPU 108 to the CPU 101. "To memory-map" means herein to allocate a memory area to a device. In the example shown in FIG. 12, as an address space used for mapping to the counterpart between the group ID "1" (CPU 101) and the group ID "2" (CPU 108), the same addresses "0x00-00-10-00" to "0x00-00-20-00" are set to the CPUs 101 and 108. Such a setting brings about address conflict between the two CPUs. This results from the fact that the CPUs 101 and 108 allocate their own address spaces independently of each other.

As stated above, if the conflict of the address space used to be memory-mapped to the counterpart occurs between the CPUs 101 and 108, it is difficult to hold a normal communication between those CPUs by an ordinary method. The reason is as follows. If the CPU 101, for example, writes data to the address "0x00-00-10-00" memory-mapped to the CPU 108, the data is written to the address space "0x00-00-10-00" of the CPU 108. If the CPU 108 reads the address "0x00-00-10-00" so as to read the data, the address "0x00-00-10-00" of the address space managed by the CPU 108 is read since the address space is memory-mapped to the CPU 101.

As stated above, if the conflict of the address space memory-mapped to the counterpart occurs between the CPUs, the conflict is resolved using address swap offset information. Specifically, an extension address routing table memory as shown in FIG. 13 is prepared and settings are made as shown in entries E1 and E2 shown in FIG. 13. The setting of the entry E1 means that, if a TLP frame in an area from "0x00-00-10-00" to "0x00-00-20-00" arrives from the device having the group ID "1", the TLP frame should be output from the port 2 corresponding to the CPU 108 and only the address "0x00-00-10-00" should be offset. The setting of the table entry E2 means that, if a TLP frame in an area from "0x00-00-10-00" to "0x00-00-20-00" arrives from the device having the group ID "2", the TLP frame should be output from the port 1 corresponding to the CPU 101 and only the address "0x00-00-10-00" should be offset.

It is to be noted that the group ID management table memory 2047 is set as described above and as shown in FIG. 4.

In a state in which such settings are made, the PCI express extension switch 304 performs the following operation if a TLP frame is transmitted from the CPU 101 to the CPU 108.

If a TLP frame at the address, for example, "0x00-00-10-00" is transmitted from the route complex 102 connected to the CPU 101, the TLP frame is input to the port 1 of the PCI express packet switch forwarding mechanism 20 via the PCI-PCI bridge 3041.

The input TLP header rewrite unit 205 of the PCI express packet switch forwarding mechanism 20 receives the TLP frame as the input TLP frame 21 from the port 1. Further, the input TLP header rewrite unit 205 acquires the group ID "1" corresponding to the port 1 from the group ID management table memory 2047 and writes "1" to the header of the input TLP frame 21 as the group ID. The table search unit 203 searches the extension address routing table memory shown in FIG. 13 using the address "0x00-00-10-00" and the group ID "1" as a key so as to decide the transfer destination. As a result of the search, the entry E1 is hit and output port information "2" and address swap offset information "0x00-00-10-00" are obtained.

The table search unit 203 deletes the group ID from the header of the TLP frame using the output TLP header rewrite unit 2051 and performs a processing for adding an address swap offset value "0x00-00-10-00" to the address of the input TLP frame 21. The table search unit 203 outputs the output TLP frame 22 having the address rewritten to "0x00-00-20-00" from the port 2 to which the CPU 108 is connected using the frame transfer unit 207.

The route complex 109 connected to the CPU 108 receives the TLP frame output from the port 2 via the PCI-PCI bridge 3042. As shown in FIG. 12, the PCI express extension switch 304 performs a processing for offsetting only "0x00-00-10-00" from the address space from "0x00-00-10-00" to "0x00-00-20-00" of the group ID "1", the resultant address space is mapped to address space from "0x00-00-20-00" to "0x00-00-30-00" of the group ID "2".

Conversely, if a TLP frame is transmitted from the CPU 108 to the CPU 101, the PCI express extension switch 304 performs the following operation.

If a TLP frame at an address, for example, "0x00-00-10-00" is transmitted from the route complex 109 connected to the CPU 108, the TLP frame is input to the port 2 of the PCI express packet switch forwarding mechanism 20 via the PCI-PCI bridge 3042.

The input TLP header rewrite unit 205 of the PCI express packet switch forwarding mechanism 20 receives the TLP frame as the input TLP frame 21 from the port 2. Further, the input TLP header rewrite unit 205 acquires the group ID "2" corresponding to the port 2 from the group ID management table memory 2047 and writes "2" to the header of the input TLP frame 21 as the group ID. The table search unit 203 searches the extension address routing table memory shown in FIG. 13 using the address "0x00-00-10-00" and the group ID "2" as a key so as to decide the transfer destination. As a result of the search, the entry E2 is hit and output port information "1" and address swap offset information "0x00-00-10-00" are obtained.

The table search unit 203 deletes the group ID from the header of the TLP frame using the output TLP header rewrite unit 2051 and performs a processing for adding an address swap offset value "0x00-00-10-00" to the address of the input TLP frame 21. The table search unit 203 outputs the output TLP frame 22 having the address rewritten to "0x00-00-20-00" from the port 1 to which the CPU 101 is connected using the frame transfer unit 207.

The route complex 102 connected to the CPU 101 receives the TLP frame output from the port 1 via the PCI-PCI bridge 3041. As shown in FIG. 12, the PCI express extension switch 304 performs a processing for offsetting only "0x00-00-10-

00" from the address space from "0x00-00-10-00" to "0x00-00-20-00" of the group ID "2", the resultant address space is mapped to address space from "0x00-00-20-00" to "0x00-00-30-00" of the group ID "1".

2) Communication between CPU 101 or CPU 108 and Endpoint 105

FIG. 14 shows a setting content of a group ID management table memory used in this case. If a plurality of CPUs 101 and 108 shares the endpoint 105 therebetween, a dedicated group ID is set to the port corresponding to the endpoint 105 as shown in FIG. 14. In the example shown, the group ID "1" is set to the port 1 to which the CPU 101 is connected and the group ID "2" is set to the port 2 to which the CPU 108 is connected. Due to this, "3" is set to the port 3 to which the endpoint 105 is connected as the dedicated group ID to the port 3. By setting the dedicated group ID "3" to the endpoint 105, a dedicated virtual address space can be set in the endpoint 105.

Figure 15:
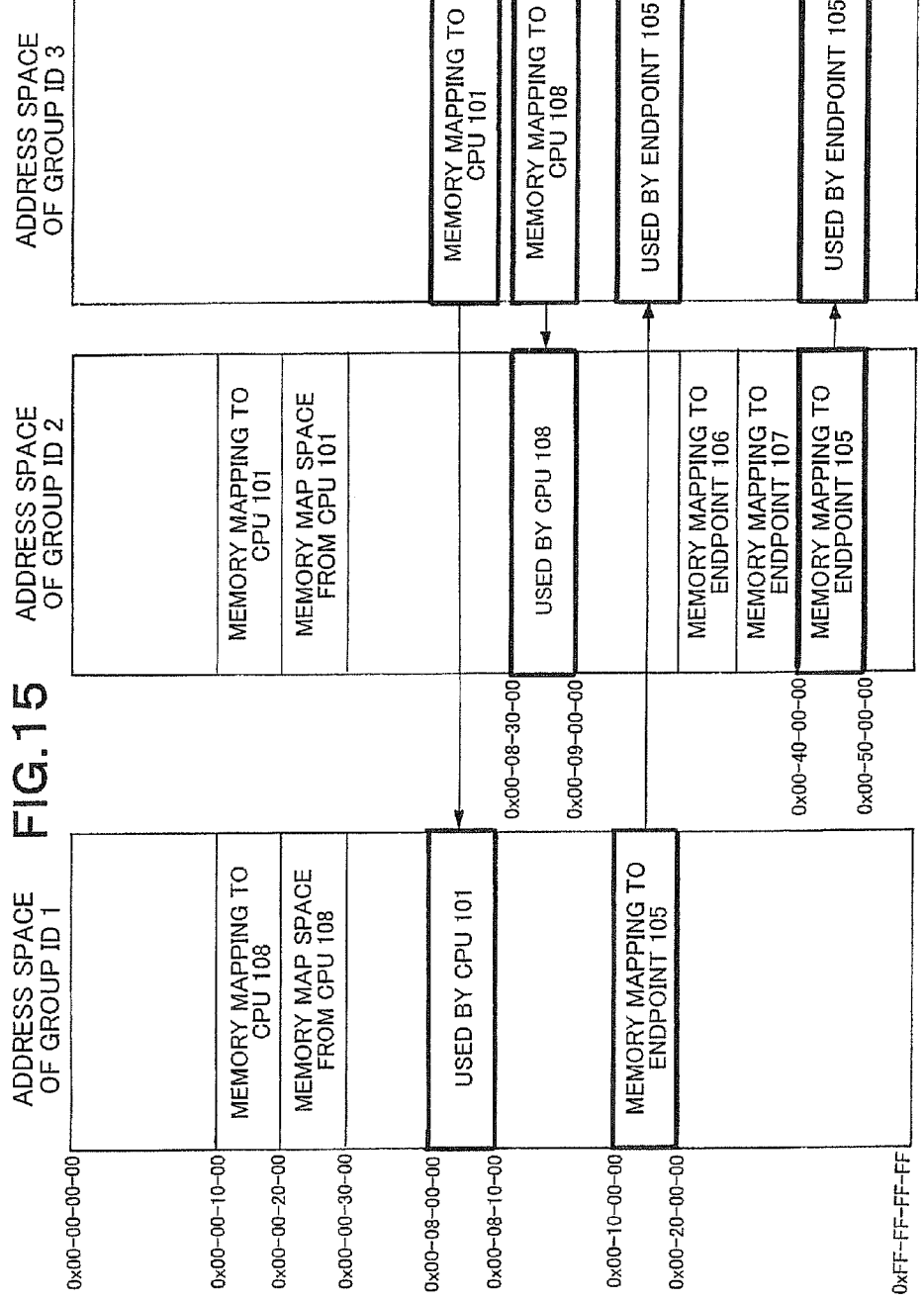
{FIG. 15} is an explanatory diagram related to address spaces if a plurality of CPUs shares endpoints according to the embodiment of the present invention.

FIG. 15 shows address space mapping in the present case. FIG. 15 shows the above-stated virtual address space allocated to the endpoint 105 (address space having the group ID "3") as well as the address space managed by the CPU 101 (address space having the group ID "1") and the address space managed by the CPU 108 (address space having the group ID "2"). If a communication is to be held between the CPU 101 and the endpoint 105, the CPU 101 memory-maps a part of the address space managed by the CPU 101 and having the group ID "1" ("0x00-10-00-00" to "0x00-20-00-00") to the endpoint 105. Conversely, the endpoint 105 memory-maps a part of the address space managed by the endpoint 105 and having the group ID "3" ("0x00-08-00-00" to "0x00-08-10-00") to the CPU 101. Likewise, if a communication is to be held between the CPU 108 and the endpoint 105, the CPU 108 memory-maps a part of the address space managed by the CPU 108 and having the group ID "2" ("0x00-40-00-00" to "0x00-50-00-00") to the endpoint 105. Conversely, the endpoint 105 memory-maps a part of the address space managed by the endpoint 105 and having the group ID "3" ("0x00-08-30-00" to "0x00-09-00-00") to the CPU 108.

Furthermore, the extension address routing table memory of the PCI express extension switch 304 is set in dependence on a setting content of memory mapping as shown in entries E11 to E14 shown in FIG. 16. The setting of the entry E11 means that, if a TLP frame in an area from "0x00-10-00-00" to "0x00-20-00-00" having the group ID "1" arrives, the frame should be output from the port 3 corresponding to the endpoint 105. The setting of the entry E12 means that, if a TLP frame in an area from "0x00-40-00-00" to "0x00-50-00-00" having the group ID "2" arrives, the frame should be output from the port 3 corresponding to the endpoint 105. The setting of the entry E13 means that, if a TLP frame in an area from "0x00-08-00-00" to "0x00-08-10-00" having the group ID "3" arrives, the frame should be output from the port 1 corresponding to the CPU 101. The setting of the entry E14 means that, if a TLP frame in an area from "0x00-08-30-00" to "0x00-09-00-00" having the group ID "3" arrives, the frame should be output from the port 2 corresponding to the CPU 108.

In a state in which such settings are made, the PCI express extension switch 304 performs the following operation if a frame is transmitted from the CPU 101 to the endpoint 105.

If a TLP frame at an address, for example, "0x00-10-00-00" is transmitted from the route complex 102 connected to the CPU 101, the TLP frame is input to the port 1 of the PCI express packet switch forwarding mechanism 20 via the PCI-PCI bridge 3041.

The input TLP header rewrite unit 205 of the PCI express packet switch forwarding mechanism 20 receives the TLP frame as the input TLP frame 21 from the port 1. Further, the input TLP header rewrite unit 205 acquires the group ID "1" corresponding to the port 1 from the group ID management table memory 2047 and writes "1" to the header of the input TLP frame 21 as the group ID. The table search unit 203 searches the extension address routing table memory shown in FIG. 16 using the address "0x00-10-00-00" and the group ID "1" as a key so as to decide the transfer destination. As a result of the search, the entry E11 is hit and output port information "3" is obtained.

The table search unit 203 deletes the group ID from the header of the TLP frame using the output TLP header rewrite unit 2051. The frame transfer unit 207 outputs the TLP frame at the address "0x00-10-00-00" from the port 3 to which the endpoint 105 is connected as the output TLP frame 22. The endpoint 105 receives the output TLP frame via the PCI-PCI bridge 3043.

A frame transmission operation for transmitting a frame from the CPU 108 to the endpoint 105 is performed as follows.

If a TLP frame at an address, for example, "0x00-40-00-00" is transmitted from the route complex 109 connected to the CPU 108, the TLP frame is input to the port 2 of the PCI express packet switch forwarding mechanism 20 via the PCI-PCI bridge 3042.

The input TLP header rewrite unit 205 of the PCI express packet switch forwarding mechanism 20 receives the TLP frame as the input TLP frame 21 from the port 2. Further, the input TLP header rewrite unit 205 acquires the group ID "2" corresponding to the port 2 from the group ID management table memory 2047 and writes "2" to the header of the input TLP frame 21 as the group ID. The table search unit 203 searches the extension address routing table memory shown in FIG. 16 using the address "0x00-40-00-00" and the group ID "2" as a key so as to decide the transfer destination. As a result of the search, the entry E12 is hit and output port information "3" is obtained.

The table search unit 203 deletes the group ID from the header of the TLP frame using the output TLP header rewrite unit 2051. The frame transfer unit 207 outputs the TLP frame at the address "0x00-40-00-00" from the port 3 to which the endpoint 105 is connected as the output TLP frame 22. The endpoint 105 receives the output TLP frame via the PCI-PCI bridge 3043.

Conversely from the above, the PCI express extension switch 304 performs the following operation if a frame is transmitted from the endpoint 105 to the CPU 101.

If a TLP frame at an address, for example, "0x00-08-00-00" is transmitted from the endpoint 105, the TLP frame is input to the port 3 of the PCI express packet switch forwarding mechanism 20 via the PCI-PCI bridge 3043.

The input TLP header rewrite unit 205 of the PCI express packet switch forwarding mechanism 20 receives the TLP frame as the input TLP frame 21 from the port 3. Further, the input TLP header rewrite unit 205 acquires the group ID "3" corresponding to the port 3 from the group ID management table memory 2047 and writes "3" to the header of the input TLP frame 21 as the group ID. The table search unit 203 searches the extension address routing table memory shown in FIG. 16 using the address "0x00-08-00-00" and the group ID "3" as a key so as to decide the transfer destination. As a result of the search, the entry E13 is hit and output port information "1" is obtained.

The table search unit 203 deletes the group ID from the header of the TLP frame using the output TLP header rewrite unit 2051. The frame transfer unit 207 outputs the TLP frame at the address "0x00-08-00-00" from the port 1 to which the CPU 101 is connected as the output TLP frame 22. The route complex 102 receives the output TLP frame via the PCI-PCI bridge 3041.

Transmission of a TLP frame from the endpoint 105 to the CPU 108 is as follows.

If a TLP frame at an address, for example, "0x00-08-30-00" is transmitted from the endpoint 105, the TLP frame is input to the port 3 of the PCI express packet switch forwarding mechanism 20 via the PCI-PCI bridge 3043.

The input TLP header rewrite unit 205 of the PCI express packet switch forwarding mechanism 20 receives the TLP frame as the input TLP frame 21 from the port 3. Further, the input TLP header rewrite unit 205 acquires the group ID "3" corresponding to the port 3 from the group ID management table memory 2047 and writes "3" to the header of the input TLP frame 21 as the group ID. The table search unit 203 searches the extension address routing table memory shown in FIG. 16 using the address "0x00-08-30-00" and the group ID "3" as a key so as to decide the transfer destination. As a result of the search, the entry E14 is hit and output port information "2" is obtained.

The table search unit 203 deletes the group ID from the header of the TLP frame using the output TLP header rewrite unit 2051. The frame transfer unit 207 outputs the TLP frame at the address "0x00-08-30-00" from the port 2 to which the CPU 108 is connected as the output TLP frame 22. The route complex 109 receives the output TLP frame via the PCI-PCI bridge 3042.

Advantages of the embodiment of the present invention will be described.

The PCI express packet switch forwarding mechanism 20 can transfer a TLP frame between arbitrary PCI-PCI bridges. It is thereby possible to transfer a TLP frame between the route complexes 102 and 109 and to transfer TLP frames from a plurality of route complexes 102 and 109 to the same endpoint. Furthermore, the PCI express packet switch forwarding mechanism 20 performs a header rewrite processing for setting a group ID to a header of an input TLP frame and then uses a forwarding table corresponding to the TLP frame. It is thereby possible to avoid address conflict that may possibly occur to address space independently managed by a plurality of CPUs (101 and 108). Therefore, according to the embodiment of the present invention, a communication can be held between a plurality of CPUs connected to the route complex side without performing frame encapsulation that causes an increase in delay during data transfer and an increase in LSI circuit scale. It is also possible to hold a communication from a plurality of CPUs connected to different route complexes to the same endpoint.

Moreover, the PCI express packet switch forwarding mechanism 20 selects transfer destination information while referring to the multicast table memory if a TLP frame is an ID routing frame and multicast communication is set to the TLP frame. It is thereby possible to multicast transfer data to specific devices. Therefore, if the PCI express extension switch 304 according to the embodiment of the present invention is used, a network system for multicast transferring data to specific devices using only one type of a switch can be constructed. This respect will be described with reference to FIG. 17.

Figure 17:
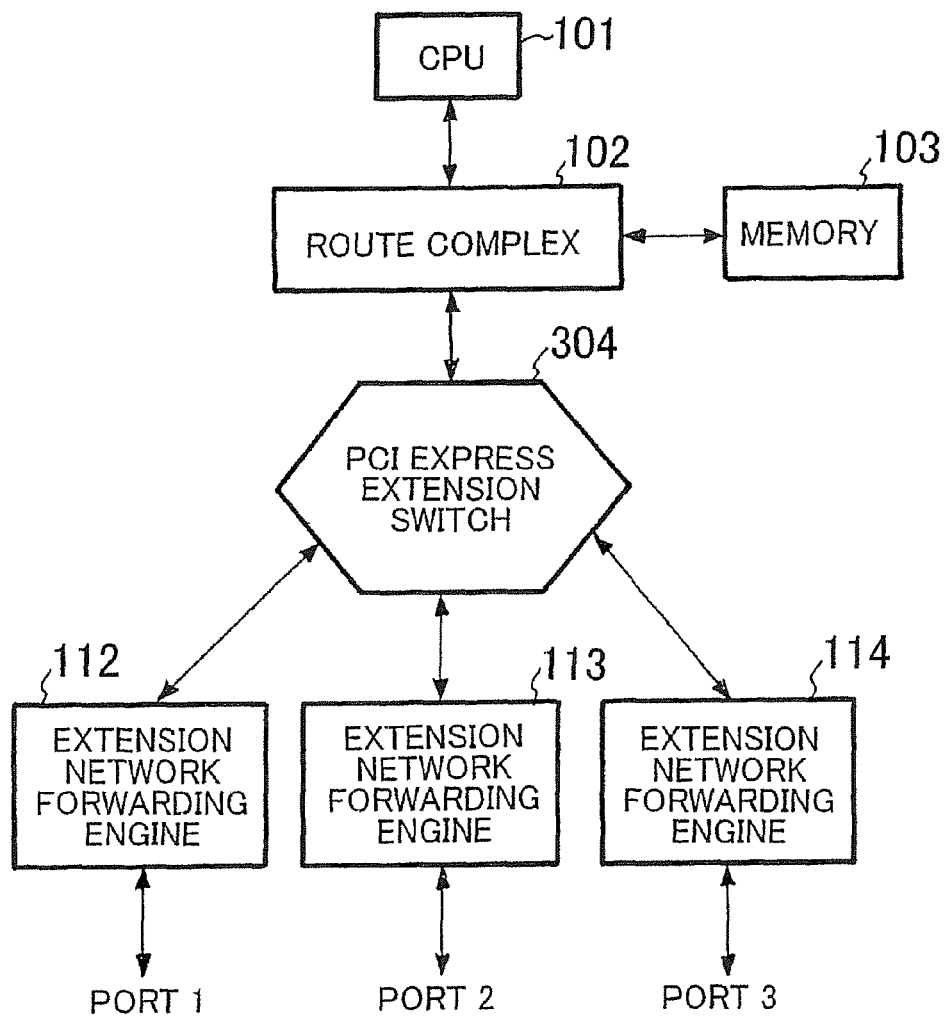
{FIG. 17} is a block diagram showing a configuration of a system using a switch according to another embodiment of the present invention.
Figure 26:
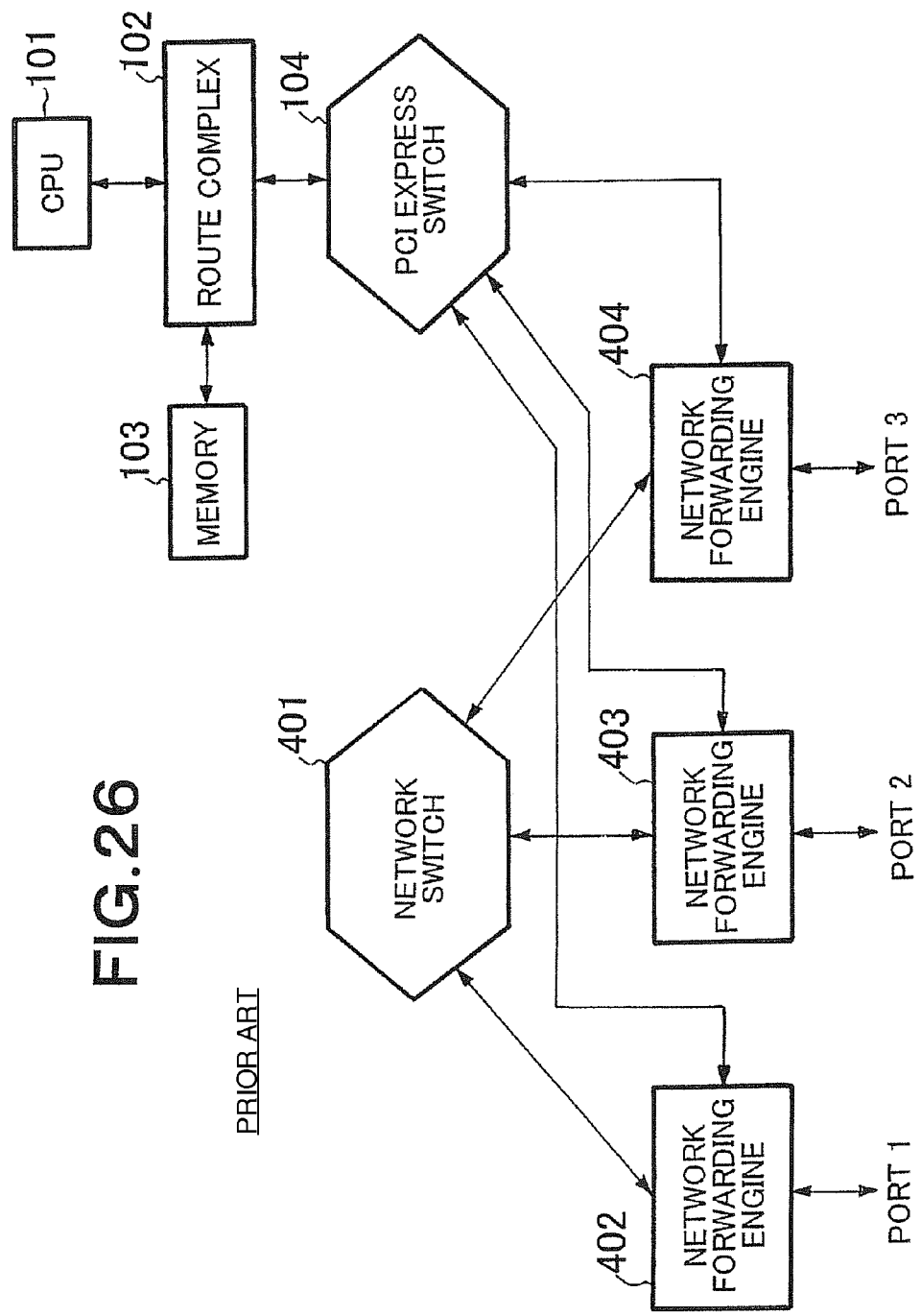
{FIG. 26} is a block diagram showing a configuration of a network system using a switch complying with the PCI express.

FIG. 17 shows a configuration of a system in which equivalent functions to those of the system shown in FIG. 26 are realized using the PCI express extension switch 304 according to the embodiment of the present invention. As already stated above, the PCI express extension switch 304 can perform multicast transfer using the extension ID routing TLP frame 9021 (FIG. 6). In the system shown in FIG. 17, a route complex 102 to which a CPU 101 and a memory 103 are connected is connected to a plurality of extension network forwarding engines 112 to 114 by a PCI express extension switch 304.

In the system shown in FIG. 17, if multicast transfer is to be performed, each of the extension network forwarding engines 112 to 114 sets "1" to the multicast indication information 903 of the extension ID routing TLP frame 9021 (FIG. 6). Furthermore, each of the extension network forwarding engines 112 to 114 transmits a frame, in which a group number employed for the multicast transfer is set to a bus number, a device number and a function number, to the PCI express extension switch 304. Upon receiving the frame, the PCI express extension switch 304 causes the table search unit 203 to search the multicast table memory 2046 (FIG. 10) using 15-bit information constituted by the bus number, the device number and the function number as a memory address to be referred. Each of the extension network forwarding engines 112 to 114 executes the multicast transfer using an output port obtained by this search. Referring to FIG. 10, if the memory address to be referred is, for example, "0x7FFF", plural output port information is "0000-0000-0001-1100". In this case, ports 3, 4 and 5 are output ports employed for the multicast transfer.

Furthermore, in the system shown in FIG. 17, if unicast transfer is to be performed, the address routing frame shown in FIG. 21 or the ID routing frame shown in FIG. 22 is used. At this time, the PCI express extension switch 304 decides a transfer port for unicast by referring to the extension address routing table memory 2044 or the extension ID routing table memory 2045.

The PCI express extension switch 304 including the multicast transfer function according to the embodiment of the present invention can be also applied to a computer system intended to improve reliability by multiplexing endpoint devices.

Figure 18:
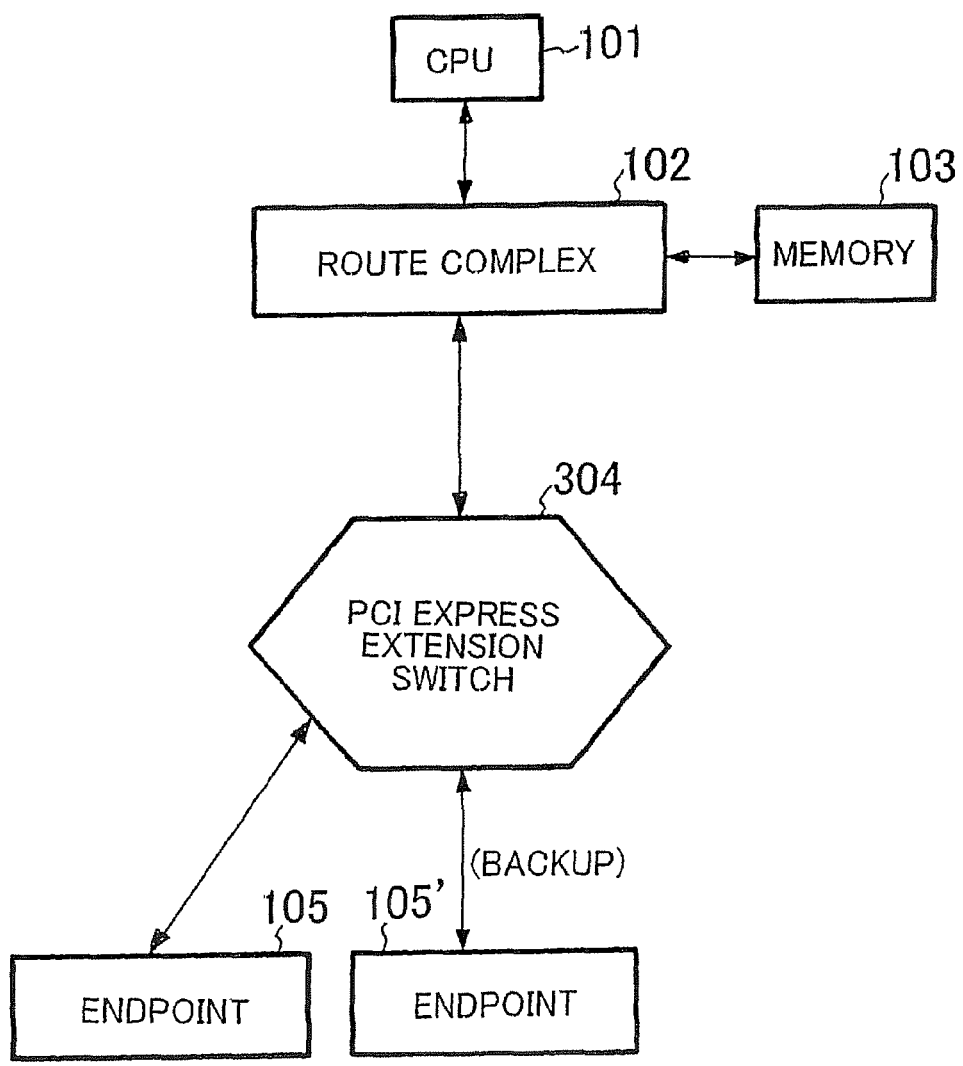
{FIG. 18} is a block diagram showing a configuration of a system using a switch according to another embodiment of the present invention.
Figure 19:
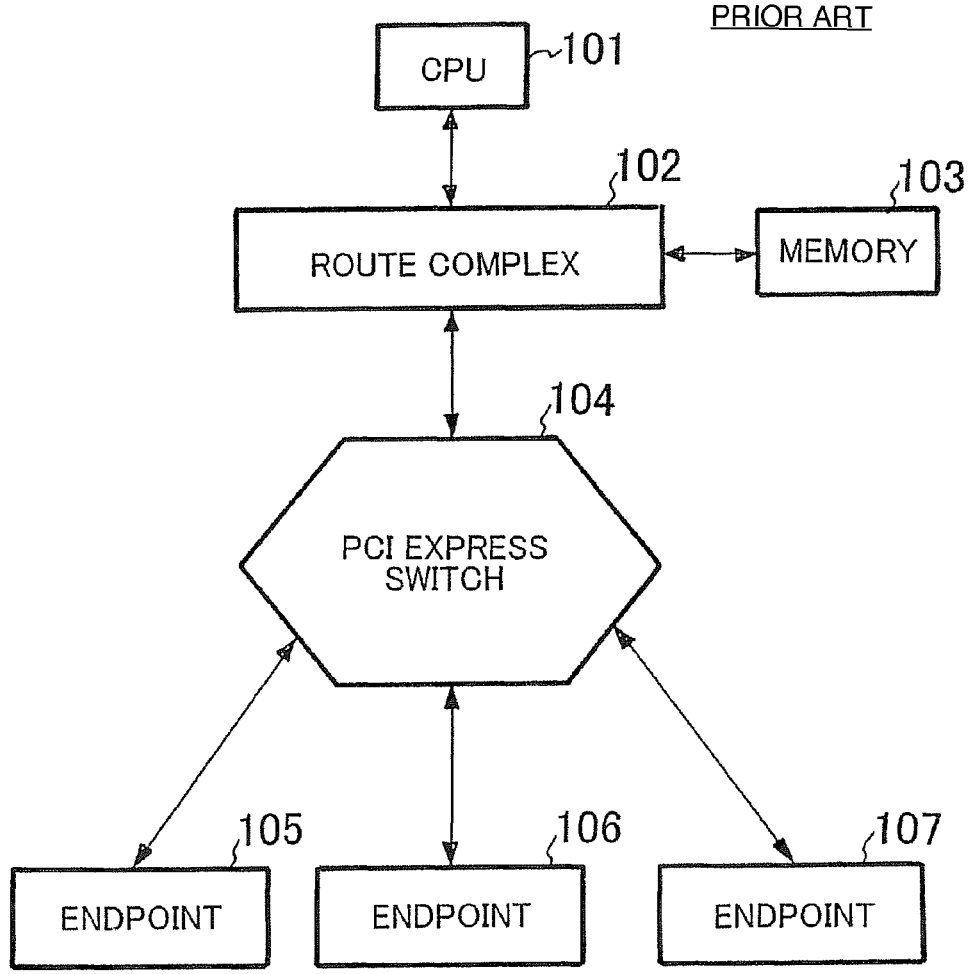
{FIG. 19} is a block diagram showing a configuration of a system based on Non-Patent Document 1.

FIG. 18 shows an example of the application to the computer system.

In a computer system shown in FIG. 18, a route complex 102 to which a CPU 101 and a memory 103 are connected is connected to an active endpoint 105 and a backup endpoint 105' for the endpoint 105 via a PCI express extension switch 304. In a normal operation mode, the PCI express extension switch 304 multicast transfers a frame transmitted from the route complex 102 to ports to which the endpoint 105 and the backup endpoint 105' are connected, respectively using the multicast transfer function. Further, the PCI express extension switch 304 transmits only a frame received from the endpoint 105 to the route complex 102. The endpoint 105 and the backup endpoint 105' can be thereby kept in the same state in the normal operation mode.

If the endpoint 105 malfunctions, the PCI express extension switch 304 transmits a frame received from the backup endpoint 105' to the route complex 102. Therefore, even if the device of endpoint 105 malfunctions, the device of the backup endpoint 105' can take over the operation of the endpoint 105 and system reliability can be improved.

The embodiments of the present invention have been described so far. However, the present invention is not limited to the above-stated examples and various other additions or changes can be made to the present invention. While the embodiments have been described on the premise of the wired-connection computer system and network system, the present invention can be applied to every system environment complying with the PCI express whether the system is wired or wireless.

The invention claimed is:

1. A switch comprising:
a plurality of bridges transmitting and receiving a TLP frame complying with PCI express between devices connected to the plurality of bridges, respectively; and
a switch forwarding mechanism including a plurality of ports to which the plurality of bridges are connected, respectively, selecting an output port in dependence on a combination of destination information in the TLP frame input from one of the plurality of ports and the input port which input the TLP frame, and outputting the TLP frame from the selected output port,
wherein the switch transfers the TLP frame through the switch forwarding mechanism between the devices connected to the plurality of bridges, and the switch forwarding mechanism includes:
a group ID management table memory storing therein information on devices to be connected to each other among the devices connected to the plurality of bridges, and group IDs for identifying ports utilized for the connection of the devices, the group IDs being associated with input ports, and grouping the devices connected to the plurality of bridges into device groups each sharing a same memory space;
a forwarding table storing therein information on output ports associated with both of the destination information in TLP frames and the group IDs stored in the group ID management table memory, and address swap offset information that indicates an offset value to be added to an address of a TLP frame to be output; and
a transfer control unit selecting from the forwarding table the output port for the TLP frame input from the one of the plurality of ports, and outputting the TLP frame from the output port,
wherein if two devices to be connected to each other have different group IDs, the transfer control unit modifies the destination information in a TLP frame according to the address swap offset information in such a way that address conflict is prevented between the two devices when a part of an address space managed by one of the two devices is allocated to the other device.

2. The switch according to claim 1,
wherein the transfer control unit includes
an input header rewrite unit reading from the group ID management table memory the group ID corresponding to one of the ports from which the TLP frame is input, and setting the read group ID in a header of the TLP frame;
a table search unit selecting from the forwarding table the output port corresponding to both of the destination information in the TLP frame and the group ID set in the header of the TLP frame; and
a frame transfer unit outputting the TLP frame from the output port selected by the table search unit.

3. The switch according to claim 2,
wherein the input header rewrite unit sets the group ID in a reservation area of the header of the TLP frame.

4. The switch according to claim 2,
wherein the group ID management table memory stores therein attribute information representing a type of each of the devices connected to the ports to which the group IDs are allocated, respectively, and
the switch forwarding mechanism includes an output header rewrite unit deleting the group ID set in the header of the TLP frame to be output from the frame transfer unit if the attribute information, related to the output port selected by the table search unit and stored in the group ID management table memory, represents a route complex or an endpoint complying with the PCI express.

5. The switch according to claim 4,
wherein the input header rewrite unit keep the group ID set in the header of the TLP frame if the attribute information, related to the port to which the TLP frame is input and stored in the group ID management table memory, represents other switch.

6. The switch according to claim 4,
wherein the forwarding table includes forwarding tables for ID routing and address routing, and
the table search unit selects the output port from one of the forwarding tables corresponding to a routing form of the TLP frame.

7. The switch according to claim 6,
wherein the forwarding table for address routing includes offset information specifying an offset amount of a memory address of each of the devices as a destination of the TLP frame, and
the output header rewrite unit rewrites the destination information in the TLP frame to be output from the TLP frame transfer unit in accordance with the offset information.

8. The switch according to claim 7,
wherein the forwarding table includes a multicast table specifying relationship between the destination information stored in the forwarding table for ID routing and the plurality of output ports, and
the table search unit selects the output port for the TLP frame from the multicast table if the routing form of the TLP frame is ID routing and information on indication of multicast communication is set in the TLP frame.

9. The switch according to claim 4,
wherein the group ID management table memory stores therein different group IDs with respect to a plurality of pieces of attribute information representing route complexes, respectively.

10. The switch according to claim 9,
wherein the group ID management table memory stores therein, for the group ID of a port connected to an endpoint used by a CPU connected to a specific route complex, the same group ID as a group ID of a port connected to the specific route complex.

11. The switch according to claim 9,
wherein the group ID management table memory stores therein, for the group ID of a port connected to an endpoint shared by a plurality of CPUs connected to a plurality of route complexes, respectively, a group ID dedicated to the endpoint.

12. The switch according to claim 2, further comprising
an external control interface for an access to the group ID management table memory and the forwarding table from an external device.

13. A system comprising:
the switch according to claim 1; and
a first PCI express bus and a second PCI express bus being connected to the switch and the different devices.

* * * * *